(12) United States Patent
Muller et al.

(10) Patent No.: US 9,529,613 B2
(45) Date of Patent: Dec. 27, 2016

(54) METHODS AND APPARATUS TO RECLAIM RESOURCES IN VIRTUAL COMPUTING ENVIRONMENTS

(71) Applicant: VMware, Inc., Palo Alto, CA (US)

(72) Inventors: Leslie Muller, London (GB); Valentina Reutova, Arlington, MA (US); Ken Pespisa, Maynard, MA (US); Mike Barron, Belmont, MA (US); Murat Bayan, London (GB); Frederic Torres, Stow, MA (US); Dave Zolotusky, Cambridge, MA (US); Derek Chasse, Stoneham, MA (US); Sudershan Bhandari, Burlington, MA (US)

(73) Assignee: VMware, Inc., Palo Alto, CA (US)

( * ) Notice: Subject to any disclaimer, the term of this patent is extended or adjusted under 35 U.S.C. 154(b) by 246 days.

(21) Appl. No.: 14/105,072

(22) Filed: Dec. 12, 2013

(65) Prior Publication Data

US 2014/0165060 A1 Jun. 12, 2014

Related U.S. Application Data

(60) Provisional application No. 61/736,422, filed on Dec. 12, 2012, provisional application No. 61/828,613, filed on May 29, 2013.

(51) Int. Cl.
*G06F 9/455* (2006.01)
*G06F 9/50* (2006.01)
(Continued)

(52) U.S. Cl.
CPC ....... *G06F 9/45533* (2013.01); *G06F 9/45558* (2013.01); *G06F 9/5022* (2013.01);
(Continued)

(58) Field of Classification Search
None
See application file for complete search history.

(56) References Cited

U.S. PATENT DOCUMENTS 6,711,616 B1 3/2004 Stamm et al.
6,763,384 B1 * 7/2004 Gupta .................... G06Q 30/08
709/224

(Continued)

FOREIGN PATENT DOCUMENTS

EP 2562973 2/2013

OTHER PUBLICATIONS

Cecchet et al, Dolly: Virtualization-driven Database Provisioning for the Cloud—UMass, Apr. 2011, ACM, VEE'11, pp. 1-12.*
(Continued)

*Primary Examiner* — Abu Ghaffari

(57) ABSTRACT

Methods and apparatus to reclaim resources in virtual computing environments are described. An example method includes determining, with a processor, if a characteristic of a virtual machine meets a threshold indicating that the virtual machine is inactive, in response to determining that the characteristic meets the threshold, determining, with the processor, if a notification period has expired, and if the notification period has expired, de-provisioning, with the processor, the virtual machine to return computing resources assigned to the virtual machine to a cloud.

20 Claims, 21 Drawing Sheets

(51) Int. Cl.
G06F 11/34 (2006.01)
G06F 9/54 (2006.01)
(52) U.S. Cl.
CPC ............ *G06F 9/5077* (2013.01); *G06F 9/542* (2013.01); *G06F 11/3466* (2013.01); *G06F 2009/45575* (2013.01); *G06F 2212/152* (2013.01)

(56) References Cited

U.S. PATENT DOCUMENTS

| | | | |
|---|---|---|---|
| 7,225,220 B2 | 5/2007 | Gonzalez et al. | |
| 7,805,419 B2 | 9/2010 | Newman | |
| 7,996,458 B2 | 8/2011 | Nielsen et al. | |
| 8,396,807 B1* | 3/2013 | Yemini | G06Q 10/06 705/400 |
| 8,473,584 B2* | 6/2013 | Sabiwalsky | G06F 9/54 709/218 |
| 8,775,625 B2* | 7/2014 | Narayanaswamy | G06F 9/4856 709/226 |
| 8,881,144 B1* | 11/2014 | Banerjee | G06F 9/461 707/813 |
| 9,003,019 B1* | 4/2015 | Guo | G06Q 10/10 370/352 |
| 9,003,406 B1 | 4/2015 | Hodge et al. | |
| 9,154,556 B1* | 10/2015 | Dotan | H04L 67/14 |
| 9,311,159 B2* | 4/2016 | Mao | G06F 9/5072 |
| 2005/0203921 A1 | 9/2005 | Newman et al. | |
| 2005/0268298 A1* | 12/2005 | Hunt | G06F 9/4856 718/1 |
| 2006/0075079 A1 | 4/2006 | Powers et al. | |
| 2006/0150159 A1 | 7/2006 | Fellenstein et al. | |
| 2007/0277010 A1* | 11/2007 | Anand | G06F 11/2097 711/162 |
| 2008/0134175 A1 | 6/2008 | Fitzgerald et al. | |
| 2008/0134176 A1* | 6/2008 | Fitzgerald | G06F 9/45537 718/1 |
| 2008/0244579 A1 | 10/2008 | Muller | |
| 2009/0210869 A1 | 8/2009 | Gebhart et al. | |
| 2009/0276771 A1 | 11/2009 | Nickolov et al. | |
| 2010/0088692 A1* | 4/2010 | Rathi | G06F 8/65 717/171 |
| 2010/0228819 A1* | 9/2010 | Wei | G06F 9/505 709/203 |
| 2010/0229168 A1* | 9/2010 | Maeda | G06F 1/3203 718/1 |
| 2011/0004687 A1 | 1/2011 | Takemura | |
| 2011/0029970 A1 | 2/2011 | Arasaratnam | |
| 2011/0055707 A1 | 3/2011 | Kimmet | |
| 2011/0154320 A1 | 6/2011 | Verma | |
| 2012/0089666 A1 | 4/2012 | Goswami et al. | |
| 2012/0166744 A1* | 6/2012 | Yamashita | G06F 12/0261 711/159 |
| 2012/0290765 A1* | 11/2012 | Durrant | G06F 12/023 711/6 |
| 2012/0324070 A1 | 12/2012 | Campion et al. | |
| 2012/0324116 A1 | 12/2012 | Dorai et al. | |
| 2012/0331388 A1 | 12/2012 | Nedelcu et al. | |
| 2013/0091543 A1* | 4/2013 | Wade | G06F 21/54 726/1 |
| 2013/0145367 A1 | 6/2013 | Moss et al. | |
| 2013/0227710 A1* | 8/2013 | Barak | G06F 21/10 726/29 |
| 2013/0232498 A1 | 9/2013 | Mangtani et al. | |
| 2013/0326510 A1 | 12/2013 | Adekile et al. | |
| 2014/0130043 A1* | 5/2014 | Mahindru | G06F 9/45558 718/1 |

OTHER PUBLICATIONS

Kumar et al, System and Method for optimizing virtual sprawl solutions, Apr. 2009, IP.com, pp. 1-5.*
Rahman et al, Proposal and Evaluation of a Dynamic Resource Allocation Method based on the Load of VMs on Iaas, Feb. 2011, IEEE, pp. 1-6.*
Ribbens et al, Hybrid Computing—Where HPC meets grid and Cloud computing, Nov. 2010, FGCS 27, Elsevier, pp. 444-453.*
United States Patent and Trademark Office, "Non-Final Office Action", issued in connection with U.S. Appl. No. 14/105,069 on Jul. 27, 2015, 32 pages.
Mitchell, Dan, "DynamicOps Cloud Development Kit: Overview and Concepts: Extending Your Cloud to New Use Cases," DynamicOps.com, Jun. 2012, 12 pages.
Bourdeau, Rich, "DynamicOps Extensibility Overview: Enable, Adapt, and Extend your Infrastructure into a Business Relevant Cloud," DynamicOps.com, May 2012, 12 pages.
VMWARE, "vCloud Automation Center Introduced by VMware: vCloud Automation Center—leverages vCD to provision applications to virtual datacenters," retrieved from the Internet on Nov. 30, 2012, 7 pages.
DynamicOps, "DynamicOps Cloud Automation Center Design Center Datasheet," DynamicOps.com, Apr. 12, 2011, webpage and linked datasheet, [retrieved on Mar. 27, 2014 at dabcc.com/article.aspx?id=17668], 6 pages.
"Using VMware vFabric Application Director", VMware, Inc., vFabric Application Director 5.0, 2012 (164 pages). Last Modified Nov. 29, 2012.
"vCloud Director User's Guide", VMware, Inc., vCloud Director 5.1, 2010-2012 (126 pages). Last Modified Aug. 7, 2012.
"Infrastructure Navigator User's Guide", VMware, Inc., vCenter Infrastructure Navigator 2.0.0, 2012-2013 (38 pages). Last Modified Mar. 25, 2013.
United States Patent and Trademark Office, "Final Office Action", issued in connection with U.S. Appl. No. 14/105,069, on Dec. 1, 2015, 22 pages.
United States Patent and Trademark Office, "Non-Final Office Action", issued in connection with U.S. Appl. No. 14/105,066, on May 26, 2016, 45 pages.
United States Patent and Trademark Office, Final Office Action, issued in connection with U.S. Appl. No. 14/105,066, on Sep. 30, 2016, 27 pages.

* cited by examiner

Edit Blueprint - Application Service

Modify the blueprint by making changes below.

| Blueprint Information | Build Information | Scripting | Properties | Security |

Add Blueprints

* Component machines:

| Blueprint Name | * Component Name | Min | Max | Startup Order | Shutdown Order | Description |
|---|---|---|---|---|---|---|
| App Server Windows 2008 R2 | App Server Win | 2 | 4 | 2 | 2 | Application Server on Windows 2008 R2 Server |
| IIS Server Windows 2008 R2 | IIS Server Wind | 2 | 6 | 3 | 1 | IIS 7 on Windows 2008 R2 Server |
| SQL Server 2008 R2 | SQL Server 200 | 1 | 2 | 1 | 3 | SQL Server 2008 R2 64-bit on Windows Server 2008 R... |

(Leave blank for no maximum)

Minimum    Maximum    Approval At

Lease (days):

(Leave blank for no expiration date)

[OK] [Cancel]

FIG. 10

| Blueprint ▲ | ▽ Description | ▽ Group | ▽ Daily Cost ▽ |
|---|---|---|---|
| Apache Tomcat (vCloud vApp) | Apache Tomcat Server vApp on vCloud | Development | $1.90 |
| App Server | App Server on Windows 2008 R2 | Development | $1.97 |
| Build Automation System | Web farm for 2013 release development (Multi-Machine Service) | Development | $10.92 |
| Physical Linux Server | Physical rackmount server with SUSE Linux installed. | Development | $5.64 |
| Windows Server 2008 R2 (EC2) | Windows Server 2008 R2 (Amazon EC2) | Development | $3.36 |

10 items per page    1 - 5 of 5 items

FIG. 13

Machine Configuration

| Step 1 Application Information | Step 2 Machine Configuration | Step 3 Custom Properties | Step 4 Confirm and Finish |

|  | Web Server | App Server | DB Server |
|---|---|---|---|
|  | 1,250 Daily | 1,970 Daily | 2,200 Daily |
| # Machines | 4 (select 1 - 4) | 2 (select 1 - 4) | 2 (select 1 - unlimited) |

Reset

CPU: Custom ▼  1 2 3 4 5 6 7 8 9 10 / 1 2 3 4 5 6 7 8 9 10 / 1 2 3 4 5 6 7 8 9 10

Memory (MB): 2048 / 4096 / ...

Storage (GB): ... / 30 40 50 / ...

Back    Next

FIG. 14

Confirm and Finish

Your are about to request the following Build Automation System Application Service.

| Component Name | # Machines | Daily Cost |
|---|---|---|
| Web Server | 2 | $2.50 |
| App Server | 2 | $3.94 |
| DB Server | 2 | $4.40 |
| Daily Total | 6 | $10.84 |

Step 1 Application Information
Step 2 Machine Configuration
Step 3 Custom Properties
Step 4 Confirm and Finish Back   Finish   Cancel 1500
1502

Add Components

| | |
|---|---|
| Name* | MMS2608-33 |

App Server x 1    [ 2 ]

DB Server x 1    [ 0 ]

Web Server x 1    [ 0 ]

[ Submit ]   Cancel

FIG. 17

Edit Blueprint - Multi-Machine

Modify the blueprint by making changes below.

| Blueprint Information | Build Information | Network | Scripting | Properties | Security |

Transport zone: Shared Infrastructure ▼

Network: Networks (2)　　⊕ New Network ▸

| | Name ▲ | Type | Description |
|---|---|---|---|
| ✎ | Internal Application Network | Private | |
| ✎ | NAT to Shared Network Template | NAT | |

▸

Routed Gateway

Reservation policy:

[OK] [Cancel]

Edit Network — 1900

Network | Load Balancer

Services (3)

| | Protocol ▲ | Port | Health Check Interval (sec) | Response Timeout (sec) | Health Threshold | Unhealth Threshold |
|---|---|---|---|---|---|---|
| ✏ ☑ | HTTP | 80 | 5 | 5 | 2 | 3 |
| ✏ ☑ | HTTPS | 443 | 5 | 5 | 2 | 3 |
| ✏ ☐ | TCP | 8080 | | | | |

URI for HTTP service: [ ]

Members

Network adapter: [ 0 ⇵ ]

Virtual IP

* Network: [ NAT to Shared Network Template ▼ ]

IP Address: [ ]

[ OK ]  [ Cancel ]

FIG. 19

METHODS AND APPARATUS TO RECLAIM RESOURCES IN VIRTUAL COMPUTING ENVIRONMENTS

RELATED APPLICATION

This patent claims the benefit of U.S. Provisional Patent Application Ser. No. 61/736,422, filed on Dec. 12, 2012, entitled "METHODS AND APPARATUS FOR VIRTUALIZED COMPUTING" and U.S. Provisional Application Ser. No. 61/828,613, filed on May 29, 2013, entitled "METHODS AND APPARATUS FOR VIRTUALIZED COMPUTING." Both of U.S. Provisional Patent Application Ser. No. 61/736,422 and U.S. Provisional Application Ser. No. 61/828,613 are hereby incorporated herein by reference in their entirety.

FIELD OF THE DISCLOSURE

This disclosure relates generally to virtual computing, and, more particularly, to methods and apparatus to manage virtual machines.

BACKGROUND

Virtualizing computer systems provides benefits such as the ability to execute multiple computer systems on a single hardware computer, replicating computer systems, moving computer systems among multiple hardware computers, and so forth. Example systems for virtualizing computer systems are described in U.S. patent application Ser. No. 11/903,374, entitled "METHOD AND SYSTEM FOR MANAGING VIRTUAL AND REAL MACHINES," filed Sep. 21, 2007, and granted as U.S. Pat. No. 8,171,485, U.S. Provisional Patent Application No. 60/919,965, entitled "METHOD AND SYSTEM FOR MANAGING VIRTUAL AND REAL MACHINES," filed Mar. 26, 2007, and U.S. Provisional Patent Application No. 61/736,422, entitled "METHODS AND APPARATUS FOR VIRTUALIZED COMPUTING," filed Dec. 12, 2012, all three of which are hereby incorporated herein by reference in their entirety.

"Infrastructure-as-a-Service" (also commonly referred to as "IaaS") generally describes a suite of technologies provided by a service provider as an integrated solution to allow for elastic creation of a virtualized, networked, and pooled computing platform (sometimes referred to as a "cloud computing platform"). Enterprises may use IaaS as a business-internal organizational cloud computing platform (sometimes referred to as a "private cloud") that gives an application developer access to infrastructure resources, such as virtualized servers, storage, and networking resources. By providing ready access to the hardware resources required to run an application, the cloud computing platform enables developers to build, deploy, and manage the lifecycle of a web application (or any other type of networked application) at a greater scale and at a faster pace than ever before.

BRIEF DESCRIPTION OF THE DRAWINGS

FIGS. 10-20 illustrate example graphical user interfaces that may be provided by the cloud manager 138 to facilitate configuring and operating multi-machine blueprints.

DETAILED DESCRIPTION

Cloud computing platforms may provide many powerful capabilities for performing computing operations. However, taking advantage of these computing capabilities manually may be complex and/or require significant training and/or expertise. Methods and apparatus disclosed herein facilitate the management of virtual machine resources in cloud computing platforms. For example, as disclosed in detail herein, methods and apparatus disclosed herein provide for automation of management tasks such as provisioning multiple virtual machines for a multiple-machine computing system (e.g., a group of servers that inter-operate), linking provisioned virtual machines and tasks to desired systems to execute those virtual machines or tasks, and/or reclaiming cloud computing resources that are no longer in use. The improvements to cloud management systems (e.g., the vCloud Automation Center (vCAC) from VMware®), interfaces, portals, etc. disclosed herein may be utilized individually and/or in any combination. For example, all or a subset of the described improvements may be utilized.

Figure 1:
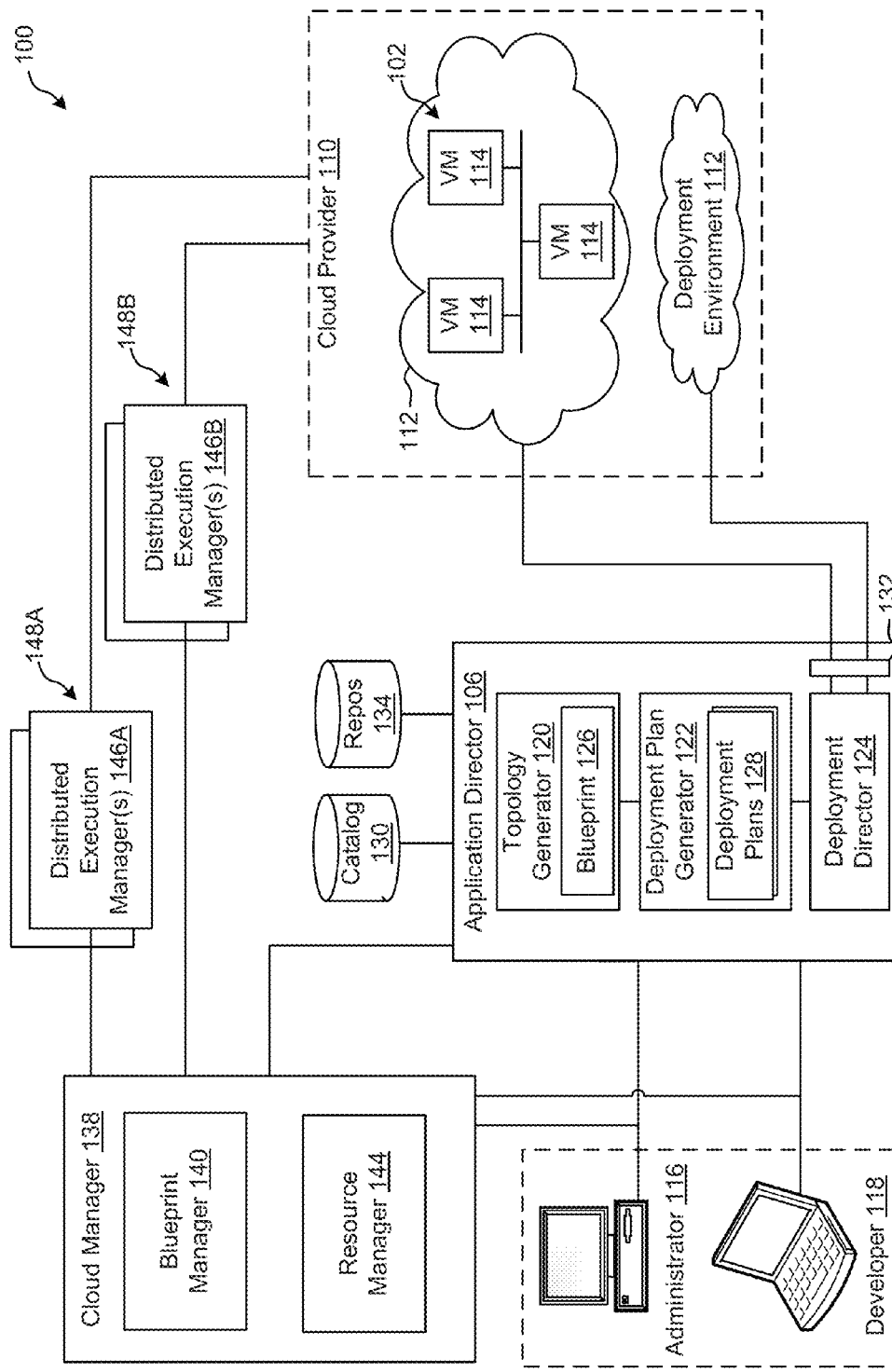
FIG. 1 is an illustration of an example system constructed in accordance with the teachings of this disclosure for managing a cloud computing platform.

FIG. 1 depicts an example system 100 constructed in accordance with the teachings of this disclosure for managing a cloud computing platform. The example system 100 includes an application director 106 and a cloud manager 138 to manage a cloud computing platform provider 110 as described in more detail below. As described herein, the example system 100 facilitates management of the cloud provider 110 and does not include the cloud provider 110. Alternatively, the system 100 could be included in the cloud provider 110.

The cloud computing platform provider 110 provisions virtual computing resources (e.g., virtual machines, or "VMs," 114) that may be accessed by users of the cloud computing platform 110 (e.g., users associated with an administrator 116 and/or a developer 118) and/or other programs, software, device, etc.

An example application 102 of FIG. 1 includes multiple VMs 114. The example VMs 114 of FIG. 1 provide different functions within the application 102 (e.g., services, portions of the application 102, etc.). One or more of the VMs 114 of the illustrated example are customized by an administrator 116 and/or a developer 118 of the application 102 relative to a stock or out-of-the-box (e.g., commonly available purchased copy) version of the services and/or application components. Additionally, the services executing on the example VMs 114 may have dependencies on other ones of the VMs 114.

As illustrated in FIG. 1, the example cloud computing platform provider 110 may provide multiple deployment environments 112, for example, for development, testing, staging, and/or production of applications. The administrator 116, the developer 118, other programs, and/or other devices may access services from the cloud computing platform provider 110, for example, via REST (Representational State Transfer) APIs (Application Programming Interface) and/or via any other client-server communication protocol. Example implementations of a REST API for cloud computing services includes a vCloud Administrator Center (vCAC) API and a vCloud Director API available from VMware, Inc. The example cloud computing platform provider 110 provisions virtual computing resources (e.g., the VMs 114) to provide the deployment environments 112 in which the administrator 116 and/or developer 118 can deploy multi-tier application(s). One particular example implementation of a deployment environment that may be used to implement the deployment environments 112 of FIG. 1 is vCloud DataCenter cloud computing services available from VMware, Inc.

The example application director 106 of FIG. 1, which may be running in one or more VMs, orchestrates deployment of multi-tier applications onto one of the example deployment environments 112. As illustrated in FIG. 1, the example application director 106 includes a topology generator 120, a deployment plan generator 122, and a deployment director 124.

The example topology generator 120 generates a basic blueprint 126 that specifies a logical topology of an application to be deployed. The example basic blueprint 126 generally captures the structure of an application as a collection of application components executing on virtual computing resources. For example, the basic blueprint 126 generated by the example topology generator 120 for an online store application may specify a web application (e.g., in the form of a Java web application archive or "WAR" file comprising dynamic web pages, static web pages, Java servlets, Java classes, and/or other property, configuration and/or resources files that make up a Java web application) executing on an application server (e.g., Apache Tomcat application server) that uses a database (e.g., MongoDB) as a data store. As used herein, the term "application" generally refers to a logical deployment unit, comprised of one or more application packages and their dependent middleware and/or operating systems. Applications may be distributed across multiple VMs. Thus, in the example described above, the term "application" refers to the entire online store application, including application server and database components, rather than just the web application itself. In some instances, the application may include the underlying hardware (e.g., virtual computing hardware) utilized to implement the components.

The example basic blueprint 126 of FIG. 1 may be assembled from items (e.g., templates) from a catalog 130, which is a listing of available virtual computing resources (e.g., VMs, networking, storage) that may be provisioned from the cloud computing platform provider 110 and available application components (e.g., software services, scripts, code components, application-specific packages) that may be installed on the provisioned virtual computing resources. The example catalog 130 may be pre-populated and/or customized by an administrator 116 (e.g., IT or system administrator) that enters in specifications, configurations, properties, and/or other details about items in the catalog 130. Based on the application, the example blueprints 126 may define one or more dependencies between application components to indicate an installation order of the application components during deployment. For example, since a load balancer usually cannot be configured until a web application is up and running, the developer 118 may specify a dependency from an Apache service to an application code package.

The example deployment plan generator 122 of the example application director 106 of FIG. 1 generates a deployment plan 128 based on the basic blueprint 126 that includes deployment settings for the basic blueprint 126 (e.g., virtual computing resources' cluster size, CPU, memory, networks) and an execution plan of tasks having a specified order in which virtual computing resources are provisioned and application components are installed, configured, and started. The example deployment plan 128 of FIG. 1 provides an IT administrator with a process-oriented view of the basic blueprint 126 that indicates discrete actions to be performed to deploy the application. Different deployment plans 128 may be generated from a single basic blueprint 126 to test prototypes (e.g., new application versions), to scale up and/or scale down deployments, and/or to deploy the application to different deployment environments 112 (e.g., testing, staging, production). The deployment plan 128 is separated and distributed as local deployment plans having a series of tasks to be executed by the VMs 114 provisioned from the deployment environment 112. Each VM 114 coordinates execution of each task with a centralized deployment module (e.g., the deployment director 124) to ensure that tasks are executed in an order that complies with dependencies specified in the application blueprint 126.

The example deployment director 124 of FIG. 1 executes the deployment plan 128 by communicating with the cloud computing platform provider 110 via a cloud interface 132 to provision and configure the VMs 114 in the deployment environment 112. The example cloud interface 132 of FIG. 1 provides a communication abstraction layer by which application director 106 may communicate with a heterogeneous mixture of cloud provider 110 and deployment environments 112. The deployment director 124 provides each VM 114 with a series of tasks specific to the receiving VM 114 (herein referred to as a "local deployment plan"). Tasks are executed by the VMs 114 to install, configure, and/or start one or more application components. For example, a task may be a script that, when executed by a VM 114, causes the VM 114 to retrieve and install particular software packages from a central package repository 134. The example deployment director 124 coordinates with the VMs 114 to execute the tasks in an order that observes installation dependencies between VMs 114 according to deployment plan 128. After the application has been deployed, the application director 106 may be utilized to monitor and/or modify (e.g., scale) the deployment.

The example cloud manager 138 of FIG. 1 interacts with the components of the system 100 (e.g., the application director 106 and the cloud provider 110) to facilitate the management of the resources of the cloud provider 110. The example cloud manager 138 includes a blueprint manager 140 to facilitate the creation and management of multi-machine blueprints and a resource manager 144 to reclaim unused cloud resources. The cloud manager 138 may additionally include other components for managing a cloud environment.

The example blueprint manager 140 of the illustrated example manages the creation of multi-machine blueprints that define the attributes of multiple virtual machines as a single container that can be provisioned, deployed, managed, etc. as a single unit. For example, a multi-machine blueprint may include definitions for multiple basic blueprints that make up a service (e.g., an e-commerce provider that includes web servers, application servers, and database servers). A basic blueprint is a definition of policies (e.g., hardware policies, security policies, network policies, etc.) for a single machine (e.g., a single virtual machine such as a web server virtual machine). Accordingly, the blueprint manager 140 facilitates more efficient management of multiple virtual machines than manually managing (e.g., deploying) virtual machine basic blueprints individually. The management of multi-machine blueprints is described in further detail in conjunction with FIG. 2.

The example blueprint manager 140 of FIG. 1 additionally annotates basic blueprints and/or multi-machine blueprints to control how workflows associated with the basic blueprints and/or multi-machine blueprints are executed. A workflow is a series of actions and decisions to be executed in a virtual computing platform. The example system 100 includes first and second distributed execution manager(s) (DEM(s)) 146A and 146B to execute workflows. According to the illustrated example, the first DEM 146A includes a first set of characteristics and is physically located at a first location 148A. The second DEM 146B includes a second set of characteristics and is physically located at a second location 148B. The location and characteristics of a DEM may make that DEM more suitable for performing certain workflows. For example, a DEM may include hardware particularly suited for performance of certain tasks (e.g., high-end calculations), may be located in a desired area (e.g., for compliance with local laws that require certain operations to be physically performed within a country's boundaries), may specify a location or distance to other DEMS for selecting a nearby DEM (e.g., for reducing data transmission latency), etc. Thus, as described in further detail in conjunction with FIG. 3, the example blueprint manager 140 annotates basic blueprints and/or multi-machine blueprints with skills that can be performed by a DEM that is labeled with the same skill.

The resource manager 144 of the illustrated example facilitates recovery of cloud computing resources of the cloud provider 110 that are no longer being activity utilized. Automated reclamation may include identification, verification and/or reclamation of unused, underutilized, etc. resources to improve the efficiency of the running cloud infrastructure. Resource reclamation is described in further detail in conjunction with FIG. 4.

Figure 2:
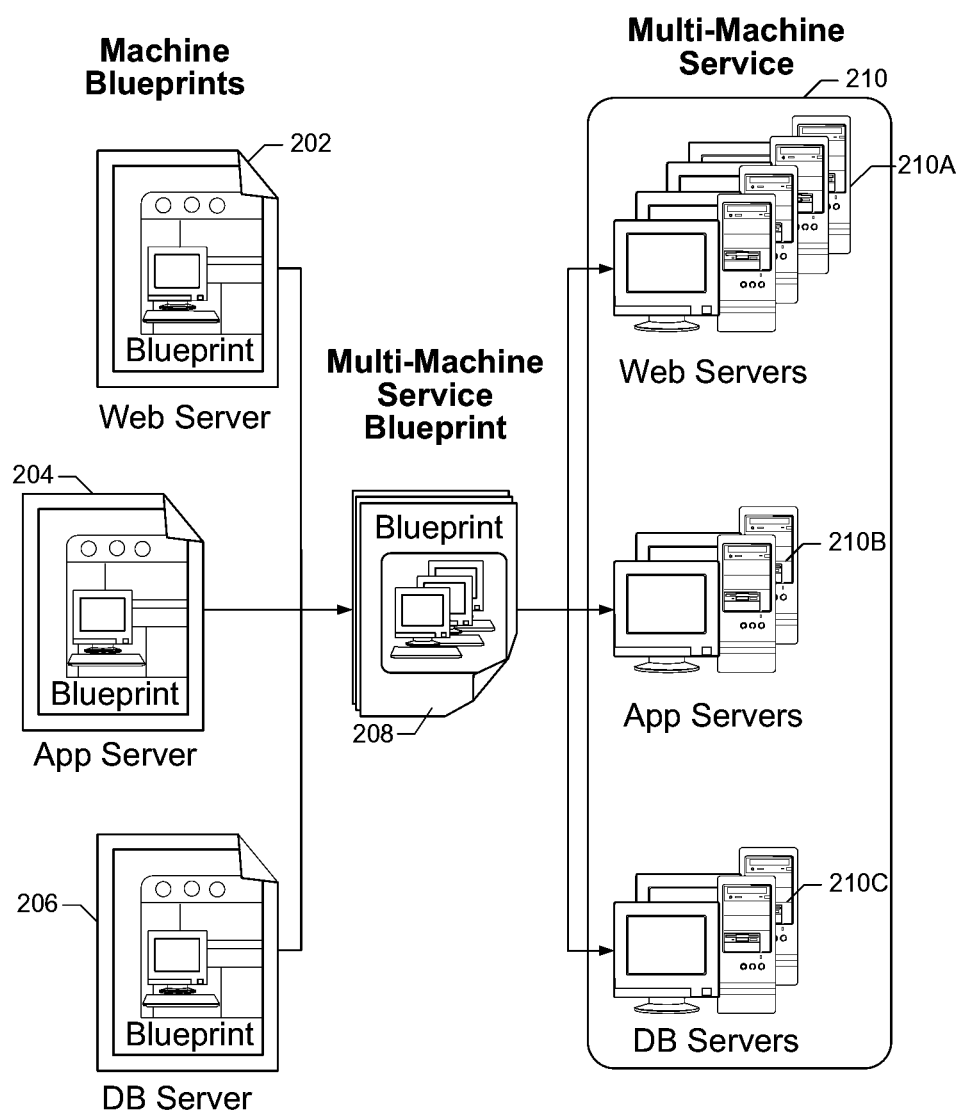
FIG. 2 illustrates the generation of an example multi-machine blueprint by the example blueprint manager of FIG. 1.

FIG. 2 illustrates the generation of a multi-machine blueprint by the example blueprint manager 140 of FIG. 1. In the illustrated example of FIG. 2, three example basic blueprints (a web server blueprint 202, an application server blueprint 204, and a database server blueprint 206) have been created (e.g., by the topology generator 120). For example, the web server blueprint 202, the application server blueprint 204, and the database server blueprint 206 may define the components of an e-commerce online store.

The example blueprint manager 140 provides a user interface for a user of the blueprint manager 140 (e.g., the administrator 116, the developer 118, etc.) to specify blueprints (e.g., basic blueprints and/or multi-machine blueprints) to be assigned to an instance of a multi-machine blueprint 208. For example, the user interface may include a list of previously generated basic blueprints (e.g., the web server blueprint 202, the application server blueprint 204, the database server blueprint 206, etc.) to allow selection of desired blueprints. The blueprint manager 140 combines the selected blueprints into the definition of the multi-machine blueprint 208 and stores information about the blueprints in a multi-machine blueprint record defining the multi-machine blueprint 208. The blueprint manager 140 may additionally include a user interface to specify other characteristics corresponding to the multi-machine blueprint 208. For example, a creator of the multi-machine blueprint 208 may specify a minimum and maximum number of each blueprint component of the multi-machine blueprint 208 that may be provisioned during provisioning of the multi-machine blueprint 208.

Accordingly, any number of virtual machines (e.g., the virtual machines associated with the blueprints in the multi-machine blueprint 208) may be managed collectively. For example, the multiple virtual machines corresponding to the multi-machine blueprint 208 may be provisioned based on an instruction to provision the multi-machine blueprint 208, may be power cycled by an instruction, may be shut down by an instruction, may be booted by an instruction, etc. As illustrated in FIG. 2, an instruction to provision the multi-machine blueprint 208 may result in the provisioning of a multi-machine service 210 that includes web server(s) 210A, application server(s) 210B, and database server 210C. The number of machines provisioned for each blueprint may be specified during the provisioning of the multi-machine blueprint 208 (e.g., subject to the limits specified during creation or management of the multi-machine blueprint 208).

The multi-machine blueprint 208 maintains the reference to the basic blueprints 202, 204, and 206. Accordingly, changes made to the blueprints (e.g., by a manager of the blueprints different than the manager of the multi-machine blueprint 208) may be incorporated into future provisionings of the multi-machine blueprint 208. Accordingly, an administrator maintaining the source blueprints (e.g., an administrator charged with managing the web server blueprint 202) may change or update the source blueprint and the changes may be propagated to the machines provisioned from the multi-machine blueprint 210. For example, if an operating system update is applied to a disk image referenced by the web server blueprint 202 (e.g., a disk image embodying the primary disk of the web server blueprint 202), the updated disk image is utilized when deploying the multi-machine blueprint 210. Additionally, the blueprints may specify that the machines 210A, 210B, and 210C of the multi-machine service 210 provisioned from the multi-machine blueprint 208 operate in different environments. For example, some components may be physical machines, some may be on-premise virtual machines, and some may be virtual machines at a cloud service.

Several multi-machine blueprints may be generated to provide one or more varied or customized services. For example, if virtual machines deployed in the various States of the United States require different settings, a multi-machine blueprint could be generated for each state. The multi-machine blueprints could reference the same build profile and/or disk image, but may include different settings specific to each state. For example, the deployment workflow may include an operation to set a locality setting of an operating system to identify a particular State in which a resource is physically located. Thus, a single disk image may be utilized for multiple multi-machine blueprints reducing the amount of storage space for storing disk images compared with storing a disk image for each customized setting.

Figure 3:
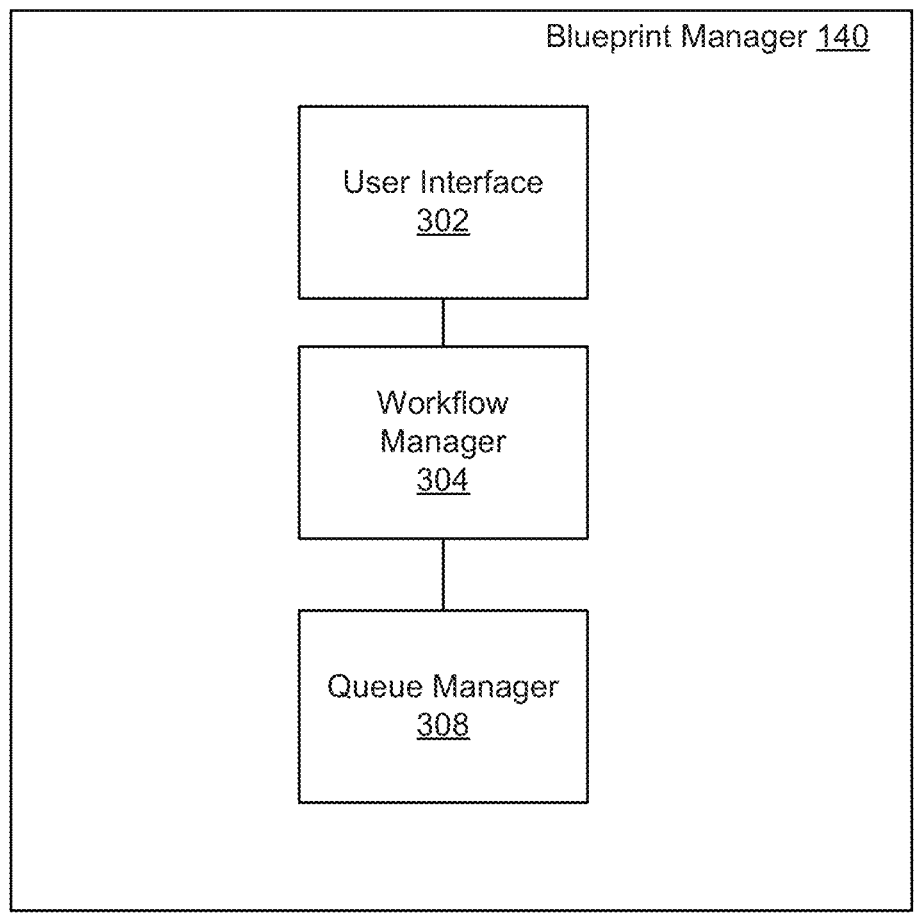
FIG. 3 is a block diagram of example components of an example implementation of the blueprint manager of FIG. 1.

FIG. 3 is a block diagram of an example implementation of the example blueprint manager 140 of FIG. 1. The example blueprint manager 140 of FIG. 3 is structured to manage the execution of blueprint (e.g., basic blueprint and/or multi-machine blueprints) workflows by distributed execution managers (e.g., DEMs 146A and 146B). The example blueprint manager 140 of FIG. 3 includes a user interface 302, a workflow manager 304, and queue manager 308.

The user interface 302 of the illustrated example receives information from a user (e.g., the administrator 116 and/or the developer 118) indicating the assignment of skills to workflows and requests to execute workflows by DEMs. A skill is a characteristic, pre-requisite, capability, etc. of a DEM that makes it more suitable and/or desirable for executing workflows assigned the same skill. A skill may indicate any information that is to be matched between DEMs and workflows during execution of workflows by DEMs (e.g., a physical location, a geographical area, a computing hardware capability, a communication capability, an installed software component, etc.). DEMs may be tagged with skills during their initial configuration. Tagging the DEM with the skill indicates that the DEM is capable of executing workflows that are also tagged with the skill.

The user interface 302 of the illustrated example passes information about skills assigned to workflows to the workflow manager 304. The user interface 302 also receives requests to remove an assignment of skills and passes the removal to the workflow manager 304.

The example workflow manager 304 labels, tags, or otherwise assigns (or removes an assignment) received workflow skills to an identified workflow. For example, the workflow manager 304 may store an indication of the skills assignment in the repository 134. The workflow manager 304 passes workflows that have been tagged or otherwise requested for execution to the queue manager 308.

The queue manager 308 of the illustrated example stores information about workflows that are awaiting execution and provides the information to DEMs that are ready to execute a workflow. For example, as a DEM has availability to execute a workflow, the DEM contacts the blueprint manager 140 and requests information about available workflows. The DEM of the illustrated example also provides information about skills that have previously been assigned to the workflow. The example queue manager 308 of FIG. 3 retrieves workflows that are awaiting execution and provides a list of workflows to the requesting DEM. The list of workflows may be sorted based on the skills assigned to the workflow and the skills assigned to the DEM, so that the DEM may choose to execute a workflow that is most closely matched with the skills of the DEM. For example, if the DEM is to select the first available workflow in the list, the workflow with the most matching skills may be first in the list. Accordingly, the workflows may be executed by the first available DEM that is most capable of executing the workflow. Because the DEMs of the illustrated example contact the example blueprint manager 140 when they are available for executing workflows, a dispatcher may not be needed and the DEMs may be kept busy without human intervention. Alternatively, workflows could be dispatched or assigned to available DEMs by the queue manager 308. In another alternative, rather than providing a list of workflows, the queue manager 308 could provide a single workflow that has been selected as most desirable (e.g., based on matching skills) for execution by a requesting DEM.

Figure 4:
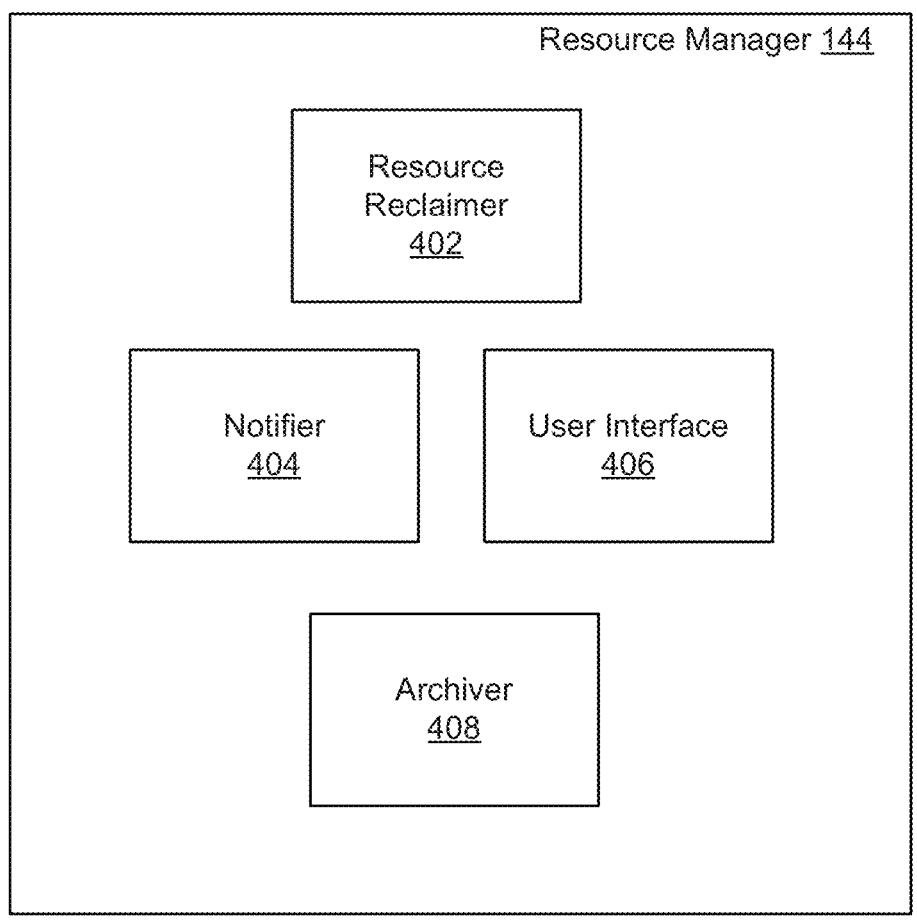
FIG. 4 is a block diagram of an example implementation of the resource manager of FIG. 1.

FIG. 4 is a block diagram of an example implementation of the example resource manager 144 of FIG. 1. The example resource manager 144 of FIG. 4 includes a resource reclaimer 402, a notifier 404, a user interface 406, and an archiver 408.

The resource reclaimer 402 of the illustrated example identifies potentially inactive, unused, underused, etc. resources by comparing an activity time to a threshold. For example, the resource reclaimer 402 may identify inactive resources by reviewing logs indicating the last time that a virtual machine was powered on, the last time that a virtual machine was remotely accessed, the amount of system resources consumed, etc. The information from the logs is analyzed (e.g., by comparing the information to a threshold) to determine if the virtual machine appears to be inactive and/or previsioned with excess resources (e.g., where four virtual machines are provisioned but only three are utilized). When the resource reclaimer 402 determines that a virtual machine may be inactive, the resource reclaimer 402 communicates the information to the notifier 404. Additionally or alternatively, the resource reclaimer 402 removes the virtual machine to free the computing resources currently assigned to the virtual machine (e.g., after a number of notifications have been sent and/or a user has confirmed that the virtual machine is no longer needed).

In some implementations, computing resources are assigned to virtual machines that are backups of active virtual machines. Ghost machines are replicas of active/live virtual machines. The ghost machines may be made live if the active/live virtual machine terminates unexpectedly or for other reasons. Because the ghost machines are typically not in use, they might appear as unused resources that should be reclaimed to be used by other cloud customers. However, this may not be desirable where the ghost resources are utilized as backups to be activated when needed. The example resource reclaimer 402 detects tags associated with the backup virtual machines that indicate that the backup virtual machines should not be identified as inactive virtual machines. When a virtual machine is detected as a backup virtual machine, the machine is not identified as potentially inactive.

The notifier 404 of the illustrated example notifies an owner of a virtual machine when the resource reclaimer 402 determines that the virtual machine is inactive. For example, the notifier 404 may send an email to the identified owner of the virtual machine. Alternatively, any other communication may be sent to the owner and/or the inactive machine may be identified on a list without sending a separate communication to the owner. The message may include information such as Machine Name, Virtual Machine Status, Reclamation Requestor, Machine Owner, Request Date, Reason for Reclamation Request, Daily Cost, Deadline to respond, etc. In example, where an email and/or other message is sent, the message may include a link or other user interface element that allows the user to indicate whether or not the identified virtual machine should remain in use. Other parties than the owner of the resource may be notified. For example, a group owner, a manager of the owner, a system administrator, etc.

The user interface 406 receives instructions from and conveys information to a user (e.g., the administrator 116 and/or the developer 118) of the resource manager 144. For example, the user interface 406 may provide an interface by which a user is to request that reclamation processing be performed (e.g., inactive and/or underused virtual machine resources should be identified). The user interface 406 may also display a status of a reclamation process including virtual machines identified as potentially inactive. The example user interface 406 additionally provides an interface for a user to configure options associated with the reclamation. For example, a user may configure the amount of time between successive notifications to the virtual machine owner, the amount of time allowed for an owner to respond before reclaiming resources, the amount of inactivity that will trigger identification of a virtual machine as potentially inactive and/or under-utilized, whether or not virtual machines that are inactivated are archived and for how long, etc. In some examples, the user interface 406 prompts a user with a list of potentially inactive virtual machines and requests that the user select the virtual machines for which the owner should be notified.

The archiver 408 of the illustrated example archives virtual machines that are reclaimed according to policies configured for the resource manager 144 and/or the virtual machine to be reclaimed (e.g., policies set in a multi-machine blueprint for the virtual machine). Archiving reclaimed virtual machines facilitates the recovery of virtual machines that may later be determined to be active and/or for which the contents are still desired. The archiver 408 of the illustrated example stores a log of reclamation operations. The log message may contain the following information: Action Date, Machine Name, Machine Owner, Action, User initiating action, Description, Prior Status of Reclamation Request, etc.

While an example manner of implementing the cloud manager 138, the blueprint manager 140, and the resource manager 144 are illustrated in FIGS. 1-4, one or more of the elements, processes and/or devices illustrated in FIGS. 1-4 may be combined, divided, re-arranged, omitted, eliminated and/or implemented in any other way. Further, the example user interface 302, the example workflow manager 304, and the example queue manager 308 of FIG. 3 and/or, more generally, the blueprint manager 140, the example resource reclaimer 402, the example notifier 404, the example user interface 406, the example archiver 408 of FIG. 4 and/or, more generally, the example resource manager 144 may be implemented by hardware, software, firmware and/or any combination of hardware, software and/or firmware. Thus, for example, any of the example user interface 302, the example workflow manager 304, and the example queue manager 308 of FIG. 3 and/or, more generally, the blueprint manager 140, the example resource reclaimer 402, the example notifier 404, the example user interface 406, the example archiver 408 of FIG. 4 and/or, more generally, the example resource manager 144 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). None of the apparatus or system claims of this patent are to be construed to cover a purely software and/or firmware implementation. Rather, at least one of the example user interface 302, the example workflow manager 304, and the example queue manager 308 of FIG. 3 and/or, more generally, the blueprint manager 140, the example resource reclaimer 402, the example notifier 404, the example user interface 406, the example archiver 408 of FIG. 4 and/or, more generally, the example resource manager 144 is/are hereby expressly defined to include a tangible computer readable storage device or storage disk such as a memory, a digital versatile disk (DVD), a compact disk (CD), a Blu-ray disk, etc. storing the software and/or firmware to preclude interpreting any claim of this patent as purely software. Further still, the example machine cloud manager 138, the example blueprint manager 140, and/or the example resource manager 144 of FIG. 1 may include one or more elements, processes and/or devices in addition to, or instead of, those illustrated in FIGS. 1-4, and/or may include more than one of any or all of the illustrated elements, processes and devices.

Flowcharts representative of example machine readable instructions for implementing the cloud manager 138, the blueprint manager 140, and/or the resource manager 144 of FIGS. 1-4 are shown in FIGS. 5-9. In these examples, the machine readable instructions comprise a program for execution by a processor such as the processor 2112 shown in the example processor platform 2100 discussed below in connection with FIG. 21. The program may be embodied in software stored on a tangible computer readable storage medium such as a CD-ROM, a floppy disk, a hard drive, a digital versatile disk (DVD), a Blu-ray disk, or a memory associated with the processor 2112, but the entire program and/or parts thereof could alternatively be executed by a device other than the processor 2112 and/or embodied in firmware or dedicated hardware. Further, although the example program is described with reference to the flowcharts illustrated in FIGS. 5-9, many other methods of implementing the example cloud manager 138, the blueprint manager 140, and/or the resource manager 144 may alternatively be used. For example, the order of execution of the blocks may be changed, and/or some of the blocks described may be changed, eliminated, or combined.

As mentioned above, the example processes of FIGS. 5-9 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of FIGS. 5-9 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

Figure 5:
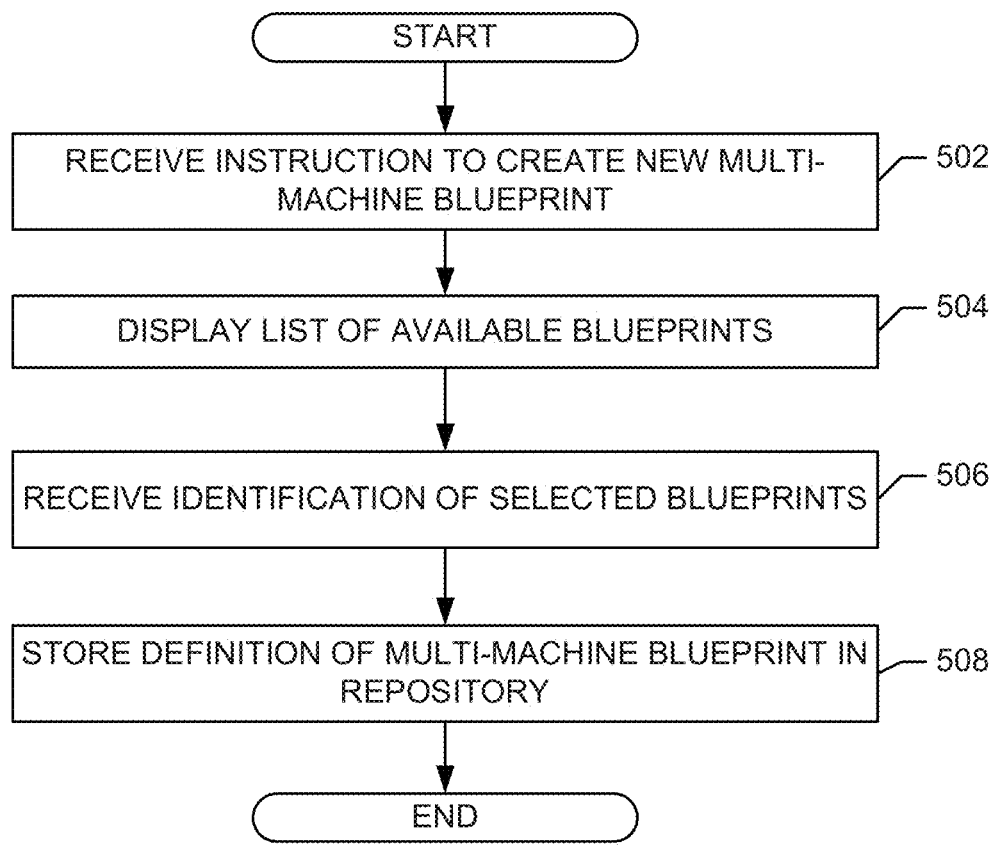
FIGS. 5-9 are flowcharts representative of example machine readable instructions that may be executed to implement the cloud manager, the blueprint manager, and/or the resource manager of FIGS. 1-4.

The example program of FIG. 5 begins at block 502 when the blueprint manager 140 of the cloud manager 138 of FIG. 1 receives an instruction to create a multi-machine blueprint (e.g., the multi-machine blueprint 208 of FIG. 2. The blueprint manager 140 displays a list of available blueprints (block 504). For example, blueprint manager 140 may display a list including the web server blueprint 202, the application server blueprint 204, the database server blueprint 206, and other available blueprints. The blueprint manager 140 then receives an identification of one or more blueprints selected for inclusion in the multi-machine blueprint (block 506). The blueprint manager 140 then generates and stores the definition for the multi-machine blueprint that references the selected blueprints in a repository (e.g., the repository 134) (block 508). The program of FIG. 5 then ends.

Figure 6:
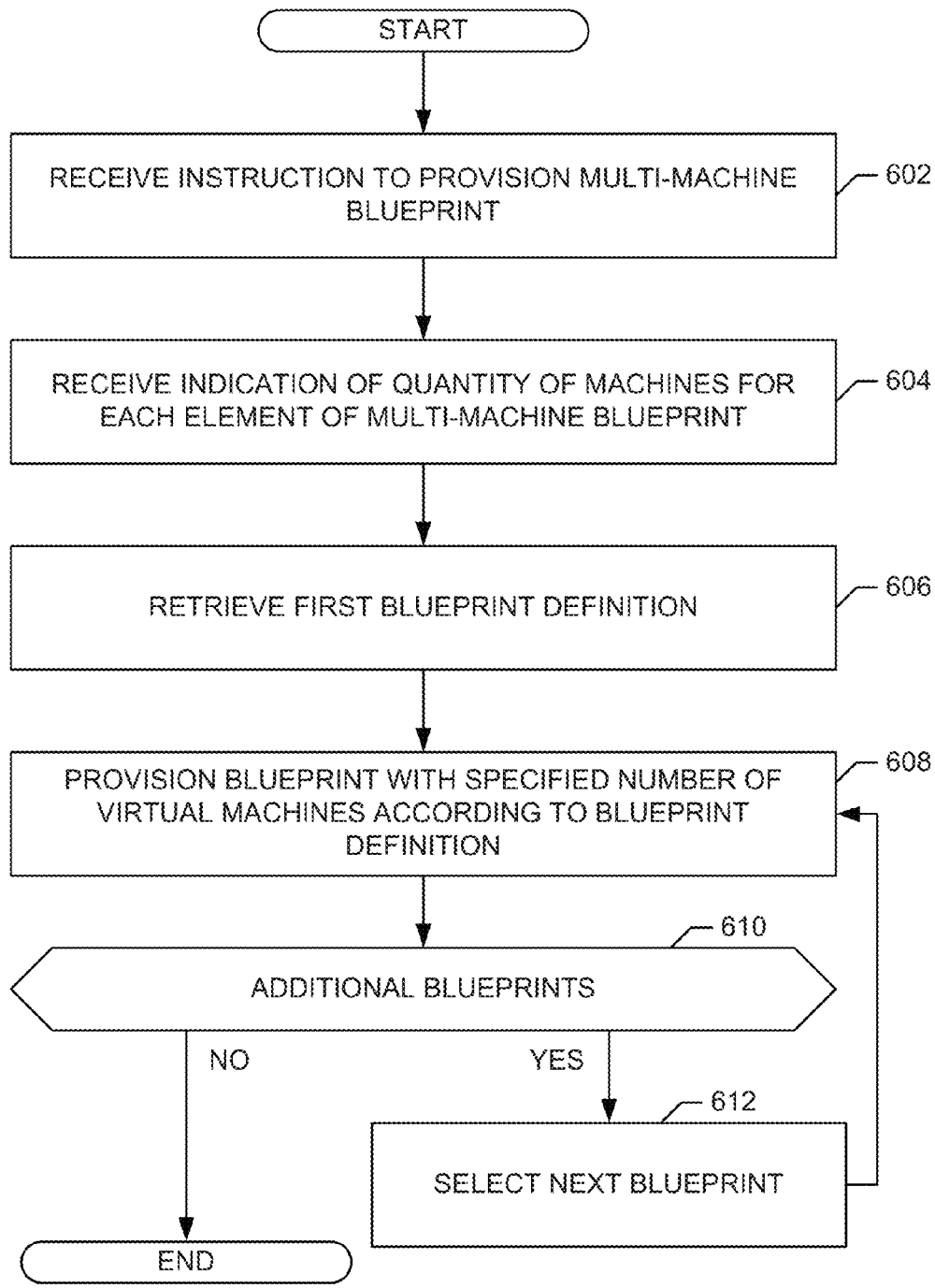

The program of FIG. 6 begins at block 602 when the blueprint manager 140 receives an instruction to provision a multi-machine blueprint (e.g., the multi-machine blueprint 208 of FIG. 2). The instruction may, alternatively, be any other instruction associated with the multi-machine blueprint 208 (e.g., power on, reboot, shutdown, etc.). Thus, a single user instruction may cause an action to be performed for all of the machines covered by the multi-machine blueprint (e.g., rather than separate user instructions for each machine or basic blueprint). The blueprint manager 140 receives an indication of quantities of machines to be provisioned (e.g., via a user interface provided by the blueprint manager 140) (block 604). The blueprint manager 140 then retrieves the first blueprint definition included in the multi-machine blueprint 208 (block 606). For example, the multi-machine blueprint 208 may include an indication of the order in which the blueprints of the multi-machine blueprint 208 are to be provisioned.

The blueprint manager 140 then provisions the selected blueprint with a specified number of machines according to the blueprint definition (block 608). For example, according to the example of FIG. 2, the blueprint manager 140 provisions four web servers 210A based on a specification of four machines in the multi-machine blueprint 208 and based on the web server blueprint 202.

The blueprint manager 140 then determines if there are additional blueprints to be provisioned (or another action instructed) (block 610). When there are additional blueprints to be provisioned, the blueprint manager 140 selects the next blueprint (block 612) and control returns to block 608 to provision the next blueprint. When there are no additional blueprints to be provisioned, the program of FIG. 6 ends.

In some examples, after provisioning of the blueprints, one or more of the provisioned machines may be encapsulated in an application collection (e.g., a VMWare vApp). For example, according to the example of FIG. 2, the machines of the web servers 210A may be collected into a web servers vApp, the machines of the application servers 210B may be collected into an application servers vApp, and the database servers 210C may be collected into a database servers vApp. Further, the multiple collections associated with the multi-machine blueprint may be collected into a multi-machine collection (e.g., a multi-machine vApp). For example, according to the example of FIG. 2, a multi-machine vApp may be generated based on the web servers vApp, the application servers vApp, and the database servers vApp. The multi-machine vApp may then be added to a catalog to allow administrators to deploy the multiple machines from a catalog (e.g., a vApp catalog).

In some examples, after a group of machines provisioned from a multi-machine blueprint are collected in a collection (e.g., an App), the collection may be migrated to a different computing type (e.g., from a physical computing type to a cloud environment). Because the components provisioned from the multi-machine blueprint are converted individually to a collection, individual components may be migrated or all components may be migrated. For example, according to the multi-machine blueprint of FIG. 2, it may be determined that web traffic will increase greatly during a particular event. Accordingly, prior to the event, a vApp generated for the web servers 210A may be migrated from a local virtual computing platform to a cloud computing service to enable additional machines to be brought online for the web service.

The abstraction provided by multi-machine blueprints enables components of a multi-machine blueprint to be provisioned on different types of computing resources (e.g., physical resources, virtual resources, cloud resources, etc.). For example, according to the example of FIG. 2, the web servers 210A may be provisioned on physical computing resources while the application servers 210B are provisioned in a first cloud service and the database servers 210C are provisioned in a second cloud service. Furthermore, the components of the multi-machine blueprint may be provisioned on different resources at different times. For example, during testing, the components of a multi-machine blueprint may be provisioned on virtual computing resources and, when testing is completed, a production system may be provisioned on physical computer resources.

After a multi-machine blueprint has been provisioned, the blueprint manager 140 may monitor the provisioned systems to check for compliance with the configuration of the multi-machine blueprint. For example, the blueprint manager 140 may periodically or aperiodically monitor the provisioned systems for changes. When a change is detected, the blueprint manager 140 may automatically revert the change, provide a notification, etc. For example, when the multi-machine blueprint is provisioned utilizing the vCAC, a user may accidently, maliciously, etc. make changes via vCenter (e.g., changes to applications, changes to network configurations, etc.). The blueprint manager 140 may periodically review the provisioned systems to determine if they match the multi-machine blueprint configuration and revert the configuration when a difference is detected (e.g., when the network configuration has been modified outside of the multi-machine blueprint configuration).

Figure 7:
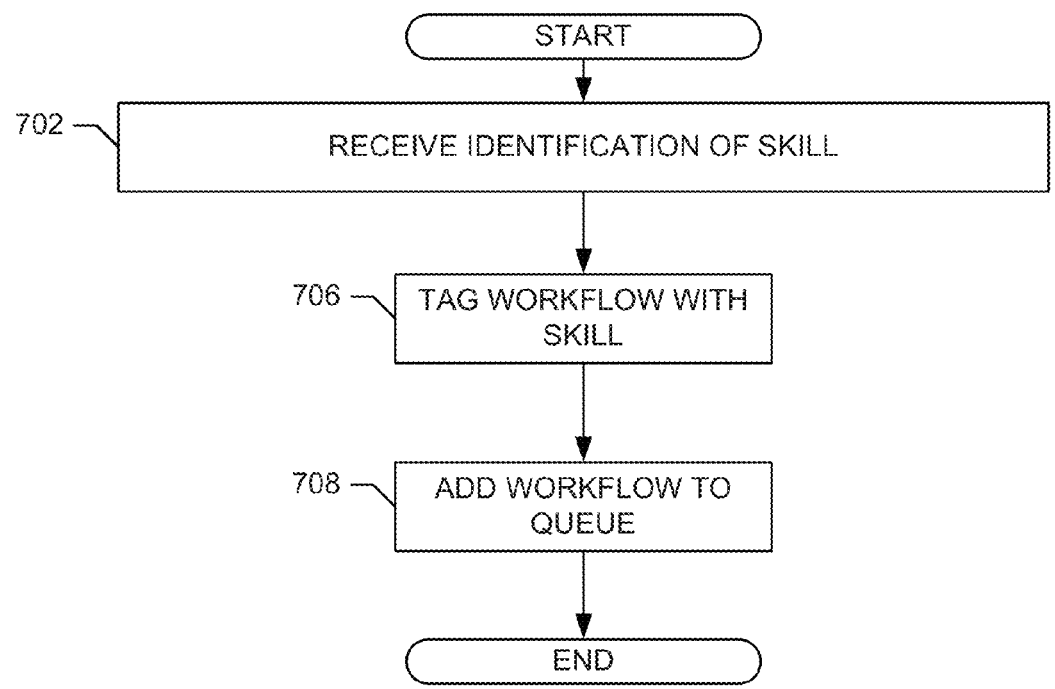

FIG. 7 is a flowchart of an example program to assign skills to workflows and DEMs. The program of FIG. 7 begins at block 702 when the user interface 302 receives an identification of a skill to be assigned to a workflow. For example, the skill may be a location, characteristic, specification, requirement, etc. that may be specified by selection from a list of skills, typed input of the name of the skill, etc. For example, the skill may be entered by clicking an "Add Skill" button displayed on the user interface 302. The user interface 302 sends the skill to the workflow manager 304. The workflow manager 304 tags the appropriate workflow with the skill (block 706). Tagging the workflow may be performed by storing an association of the skill with the workflow in a database (e.g., the repository 134). Tagging the workflow with the skill indicates that the workflow is to be performed by a DEM that is also tagged with the skill. The queue manager 308 then adds the workflow to a queue for execution by an available DEM (block 708).

Figure 8:
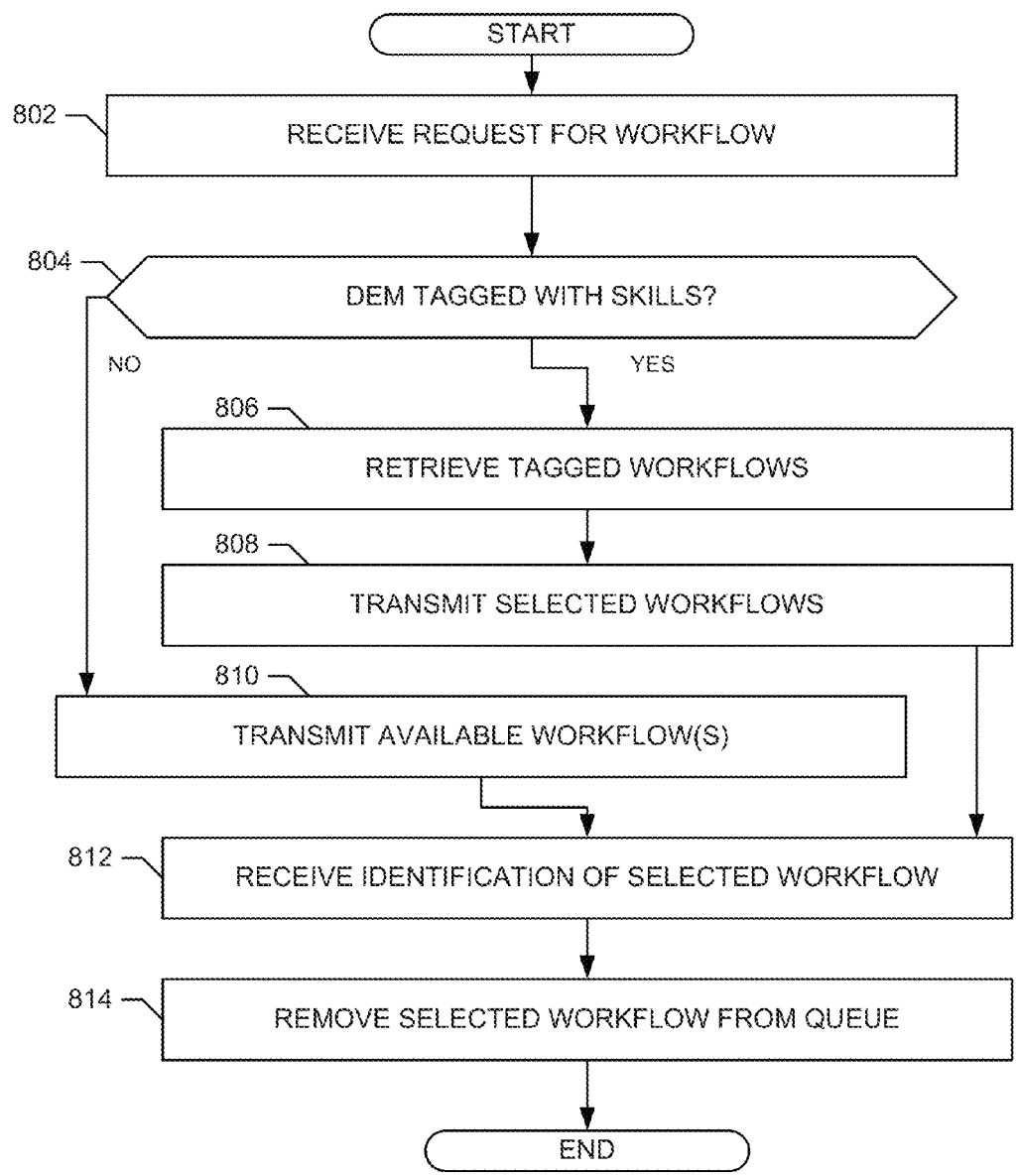

FIG. 8 is a flowchart of an example program to distribute workflows to DEMs for execution. The example program of FIG. 8 begins at block 802 when the queue manager 308 receives a request to execute for an available workflow (e.g., a workflow that is ready for execution). The queue manager 308 determines if the DEM is tagged with a skill (block 804). When the DEM is tagged with a skill, the queue manager 308 retrieves workflows that have been tagged with the skill(s) tagged to the DEM (block 806). The queue manager 308 then transmits a list of the retrieved workflows to the DEM (block 808). Returning to block 804, if the queue manager 308 determines that a DEM is not tagged with a skill, the queue manager 308 transmits a list of workflows that are not tagged with skills to the DEM (block 810). While the foregoing example transmits only workflows with matching skills (or no skills) to the requesting DEM, other arrangements may be utilized. For example, a list of all available workflows ordered or ranked by the matching skills may be transmitted to the DEM, a single workflow that has been matched to the DEM based on the skills may be transmitted to the DEM, etc. In other example, if skills may be labeled as mandatory or optional, workflows having a mandatory skill may be included in a list of available workflows sent to DEMs matching the mandatory skill and may not be included in a list of available workflows sent to DEMs that do not match the mandatory skill. In such an example, workflows having skills identified as desirable but not mandatory may be included in a list of available workflows sent to DEMs that do not match the desirable skill. The list of available workflows may be ranked based on the desirable skill to increase the chances that a DEM having the matching skills will select the workflow for execution.

After the workflows have been transmitted to the requesting DEM (block 808 or block 810), the queue manager 308 receives an identification of workflow selected for execution by the requesting DEM (block 812). The queue manager 308 then removes the workflow from the queue to ensure that the workflow is not selected by execution by another DEM (block 814).

Figure 9:
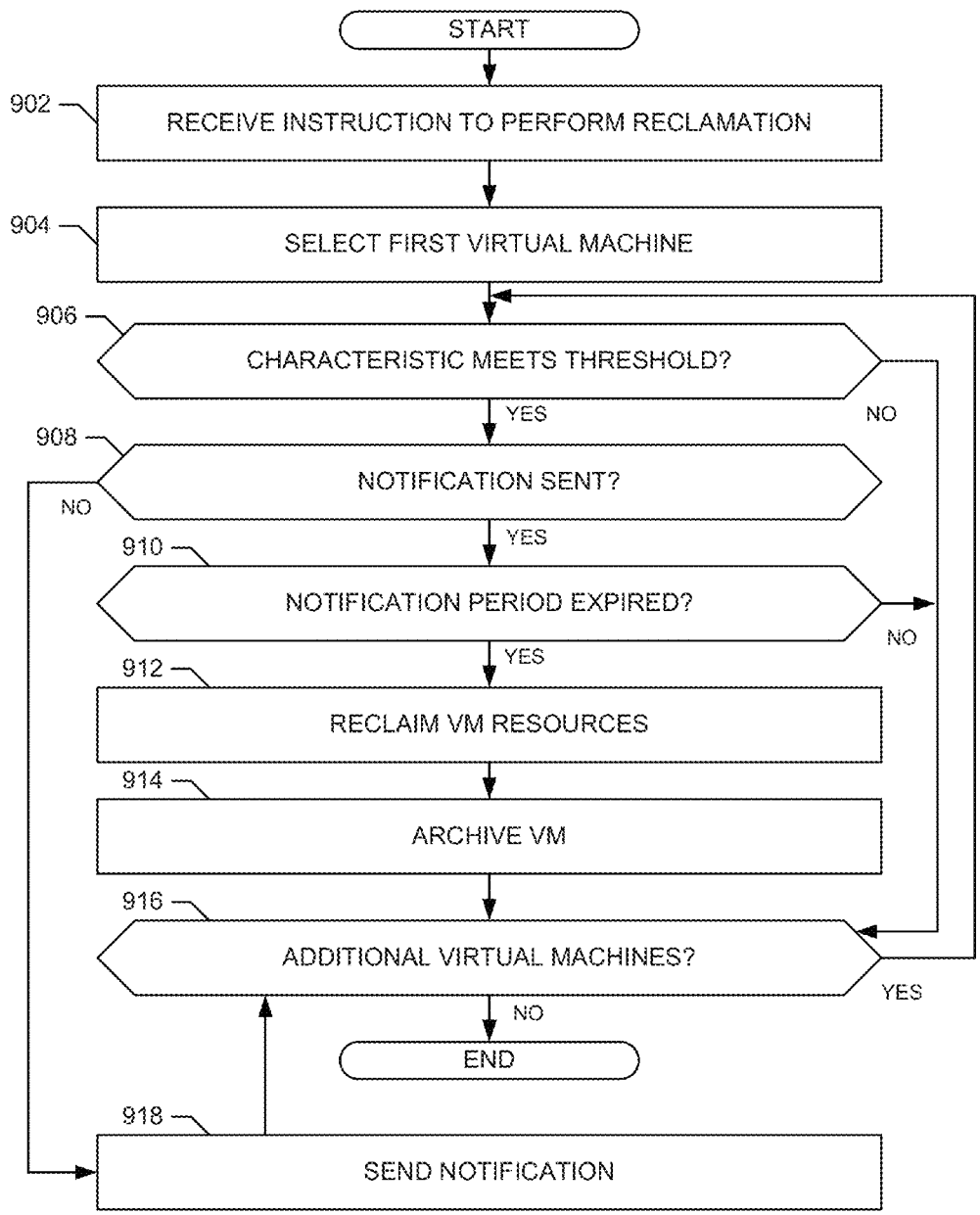

FIG. 9 is a flowchart of an example program to reclaim virtual machine computing resources from inactive virtual machines. The example program of FIG. 9 begins when the user interface 406 receives an instruction to perform a reclamation (block 902). For example, the reclamation may be a workflow for which execution is requested.

The resource reclaimer 402 selects a first virtual machine in a provisioned pool of virtual machines (block 904). The example resource reclaimer 402 then determines if characteristics associated with the virtual machine indicate that the virtual machine may be inactive (block 906). For example, the resource reclaimer 402 may determine if an action (e.g., power on, reboot, perform operation) has not been performed within a threshold period of time. When the characteristics do not meet the threshold, control proceeds to block 916, which is described below. When the characteristics meet (or exceed) the threshold, the notifier 404 determines if a notification has already been sent to the owner of the virtual machine (block 908). When a notification has not been sent, the notifier 404 sends a communication to the owner of the virtual machine indicating that the virtual machine is suspected of being inactive and requesting that the owner take action to maintain the virtual machine (block 918).

When a notification has already been sent (block 908), the notifier 404 determines if a notification period has expired (block 910). For example, a user (e.g., the user requesting the reclamation) may specify parameters indicating the amount of time that the system should wait following notification before determining that no response will be received and de-provisioning the virtual machine computing resources. When the notification period has not expired, control proceeds to block 916, which is described below.

When the notification period has expired (block 910), the resource reclaimer 402 reclaims the computing resources assigned to the inactive virtual machine by de-provisioning or uninstalling the inactive virtual machine (block 912). For example, resource reclaimer 402 may return the computing resources to a pool of resources available to other existing and new virtual machines (e.g., virtual machines in a cloud). The archiver 408 archives the inactive virtual machine in case the owner of the virtual machine or another party determines that the information contained in the virtual machine is wanted (block 914). The archiving may be performed according to archiving policies identified in a blueprint associated with the virtual machine, according to instructions from a user received via the user interface 406, and/or according to a policy for the resource manager 144. Control then proceeds to block 916.

After determining that the characteristics of the selected virtual machine do not meet (or exceed) the threshold (block 906), after determining that the notification period has not expired (block 910), and/or after archiving the virtual machine (or reclaiming the virtual machine resources if archiving is not performed), resource reclaimer 402 determines if there are additional virtual machines to be checked for inactivity. When there are additional virtual machines, the next virtual machine is selected and control returns to block 906 to analyze the next virtual machine for inactivity. When there are no additional virtual machines, the program of FIG. 9 ends.

Figure 11:
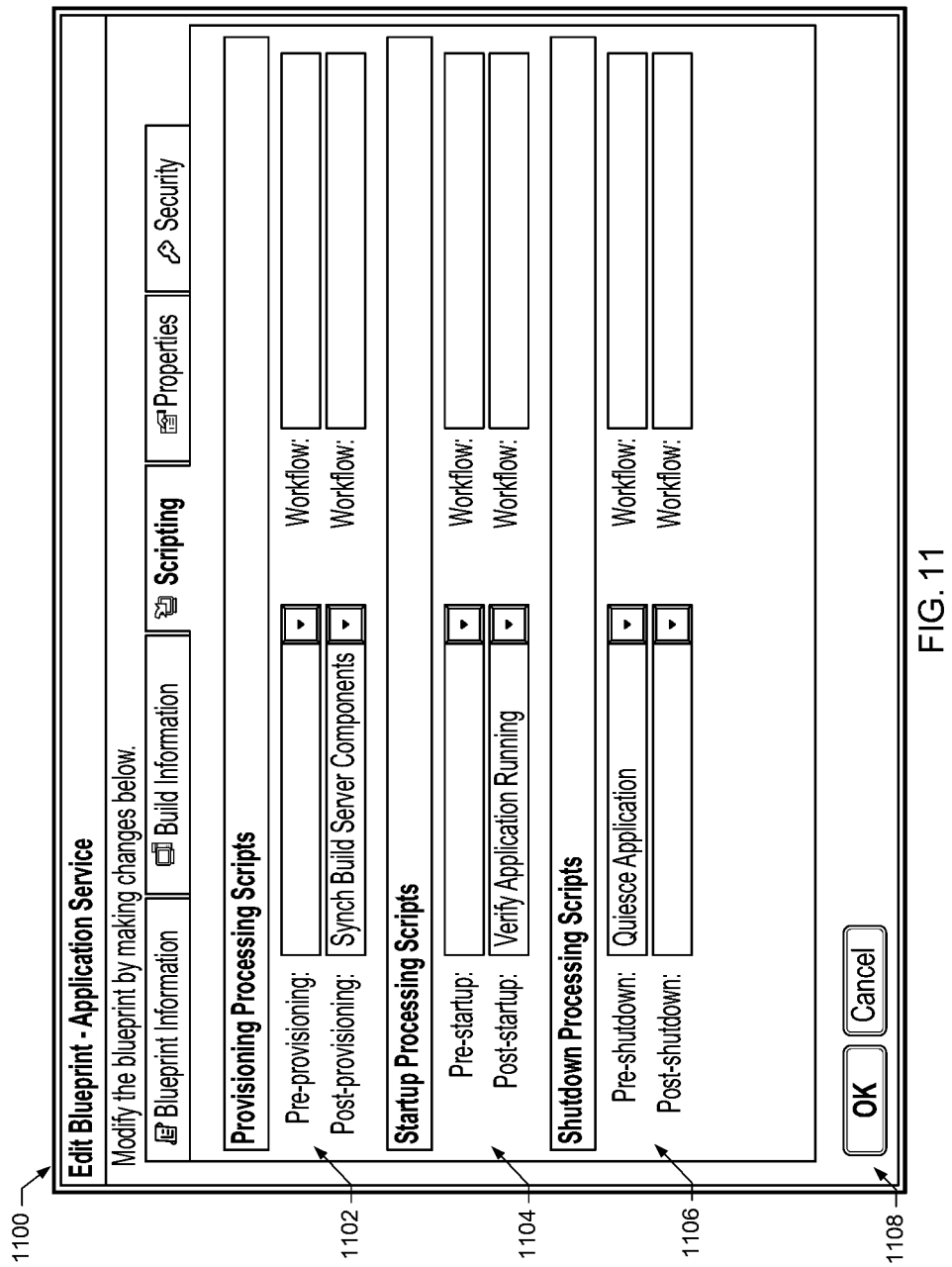
Figure 12:
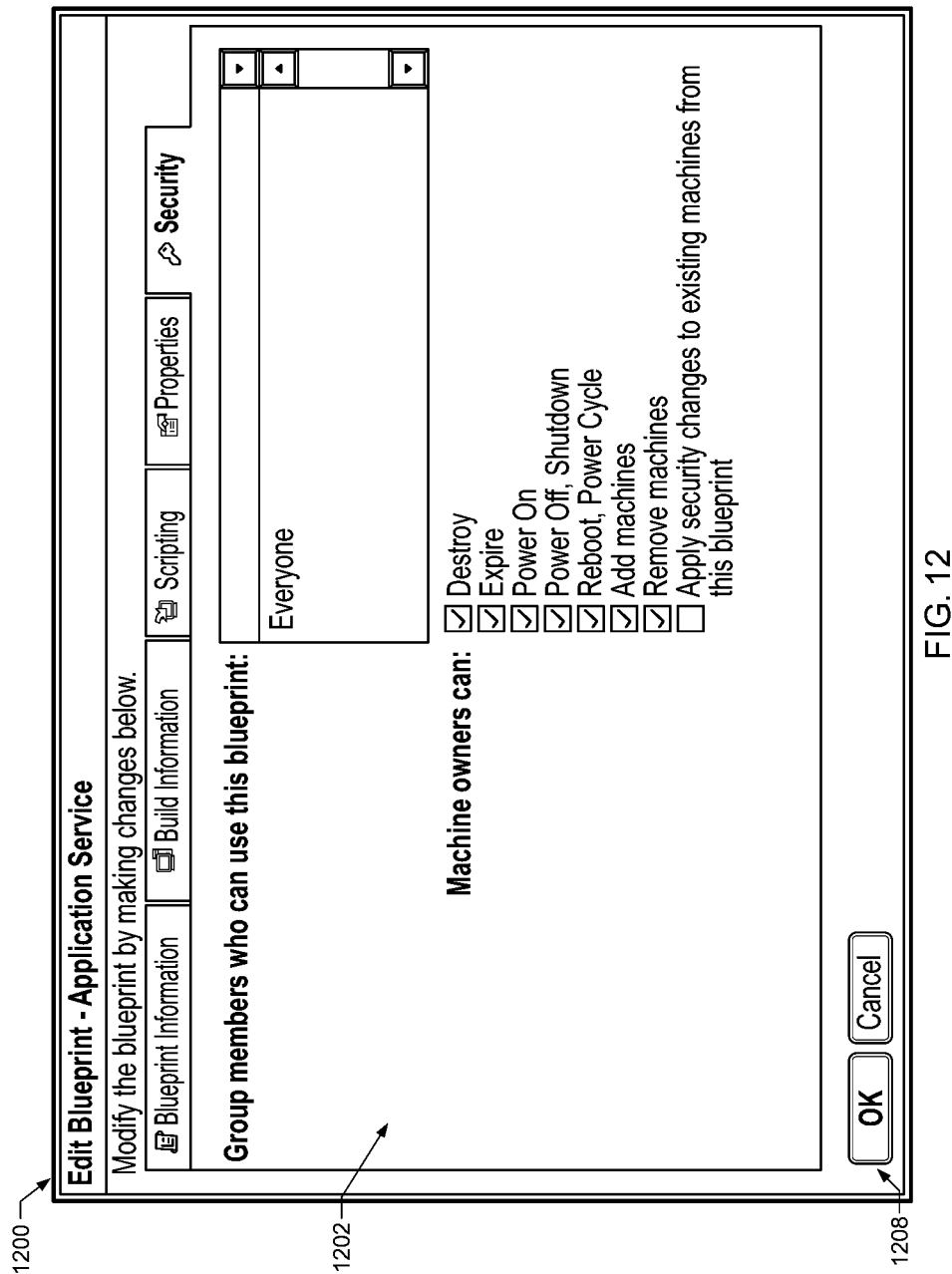

FIGS. 10-12 illustrate example graphical user interfaces that may be provided by the cloud manager 138 to facilitate creation of a multi-machine blueprint. An example graphical user interface 1000 illustrated in FIG. 10 includes a user input 1002 for requesting addition of a blueprint to a new multi-machine blueprint. For example, when the user input 1002 is selected, a listing of available blueprints in a catalog may be displayed and a user (e.g., an administrator) may select blueprint(s) for addition to the multi-machine blueprint. The example graphical user interface 1000 includes a listing 1004 of the blueprints that have been added to the multi-machine blueprint being generated. The listing 1004 additionally includes user interface elements 1006 for allowing a user to specify configuration parameters for each of the added blueprints. According to the example of FIG. 10, a user may specify a component name, a minimum number of machines, a maximum number of machines, a startup ordering, and/or a shutdown ordering. According to the illustrated example, after adding the desired blueprints and configuration parameters, a user selects an OK button 1008 to proceed to the example user interface 1100 of FIG. 11.

The example user interface 1100 includes user interface elements 1102 to allow a user to specify provisioning processing scripts to be performed during provisioning, user interface elements 1104 to allow a user to specify startup processing scripts to be performed upon startup of the multi-machines, and user interface elements 1106 to allow a user to specify shutdown processing scripts to be performed upon shutdown of the multi-machines. According to the illustrated example, after specifying the scripts, a user selects an OK button 1108 to proceed to the example user interface 1200 of FIG. 12.

The example user interface 1200 includes user interface elements 1202 to allow a user to specify security settings for the multi-machine blueprint that is being generated. While example security settings are illustrated, any number or type(s) of security settings may be provided. According to the illustrated example, after specifying the security settings, a user selects an OK button 1208 to cause the multi-machine blueprint generation to be completed. For example, in response to selection of the OK button 1208, the multi-machine blueprint may be generated and stored in a catalog to allow a user to select to provision the multi-machine blueprint.

FIGS. 13-17 illustrate example graphical user interfaces that may be provided by the cloud manager 138 to facilitate provisioning and configuration of a provisioned multi-machine blueprint. An example graphical user interface 1300 illustrated in FIG. 13 provides a listing of available resources (including multi-machine blueprints) that may be provisioned. After selecting a resource that is a multi-machine blueprint, the cloud manager 138 displays the user interface 1400 of FIG. 14 to allow configuration of the provisioning. The example illustrated in FIG. 14 includes the same components as the multi-machine blueprint 208 illustrated in FIG. 2. The user interface 1400 includes user interface elements 1402, 1404, and 1406 for specifying the settings to be used in provisioning the components of the multi-machine blueprint. The example, user interface elements 1402, 1404, and 1406 allow a user to specify a number of machines to be provisioned, a number of CPUs to be included, an amount of memory to be included, and an amount of storage to be included in each of the components of the multi-machine blueprint. The available options may be controlled by the administrator that built the multi-machine blueprint (e.g., by specifying the minimum and maximum number of machines with the user interface elements 1006). According to the illustrated example, after specifying the settings for the components of the multi-machine blueprint, a user selects a NEXT button 1408 to proceed to the example user interface 1500 of FIG. 15.

The example user interface 1500 displays a confirmation of the selections made by the user prior to the user selecting a FINISH button 1502 to provision the machines based on the settings for the components of the multi-machine blueprint.

Figure 16:
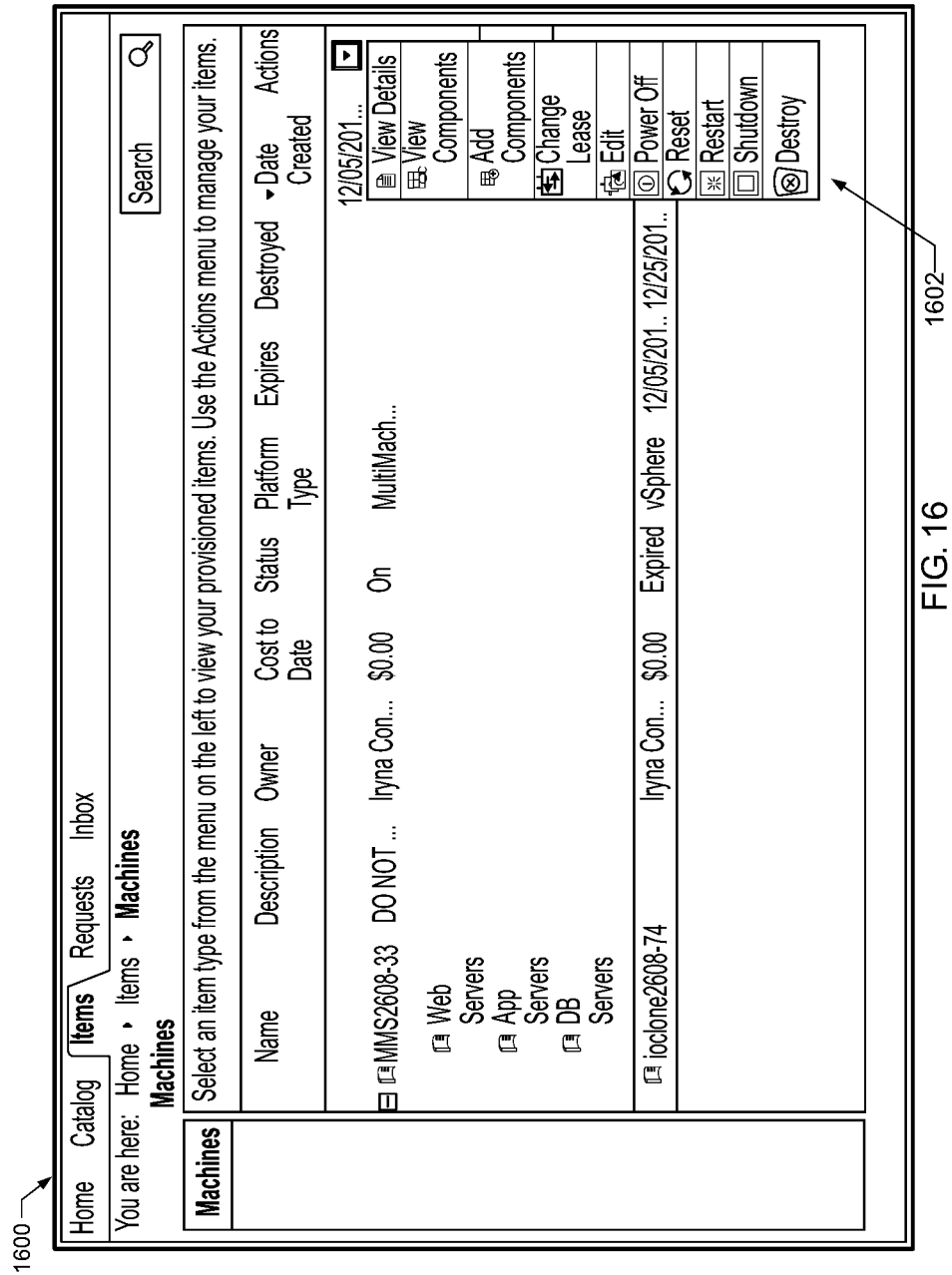

FIG. 16 illustrates an example graphical user interface 1600 that may be provided by the cloud manager 138 to facilitate configuration of a provisioned multi-machine blueprint. The graphical user interface 1600 displays of list of provisioned virtual machines, including machines provisioned from a multi-machine blueprint. A user may select a particular provisioned multi-machine blueprint (e.g., MMS2608-33 in the illustrated example that is provisioned from the multi-machine blueprint 208 of FIG. 2) and perform operations provided in an operation menu 1602. For example, a user (e.g., an administrator) may select to edit the virtual machine, add additional machines, power cycle the virtual machines, reboot the virtual machines, change the terms of a lease, delete/destroy the virtual machines, power off the virtual machines, shutdown the virtual machines, etc. Because the virtual machines are linked to a multi-machine blueprint or service, a single operation request from the operation menu 1602 (e.g., a selection of the shutdown command) is applied to all of the machines in a service. Thus, a user may select shutdown from the operations menu 1602 (e.g., with a single (i.e., one) selection) and all corresponding virtual machines referenced by the multi-machine blueprint will be shut down without the user specifying a separate shutdown command for each virtual machine provisioned from the multi-machine blueprint. While example operations are identified in the example operation menu 1602, any other operations may be included. For example, the operation menu 1602 may include an operation to perform a backup that, when selected, may cause all of the multiple machines provisioned from the multi-machine blueprint to be backed up. The operation menu 1602 may additionally include a network configuration action that enables a user to reconfigure the network operations, change load balancer settings, etc. The operation menu 1602 may also include user defined operations (e.g., scripts, tasks, etc.) created by a user for performing operations on the machines provisioned from the multi-machine blueprint.

When a user selects to add components to virtual machines provisioned from a multi-machine blueprint (e.g., using the operation menu 1602 in the example user interface 1600 of FIG. 16), the cloud manager 138 displays the example user interface 1700 of FIG. 17. The example user interface 1700 provides user interface elements to specify a desired number of additional machines to be added to the provisioned virtual machines. In examples where a maximum number of allowable machines has been specified, the user interface 1700 may restrict the number of additional machines added to remain within the specified limits (e.g., by not allowing selection of a number of machines that would exceed the maximum, by displaying an error messages when too many machines are selected, etc.). Adding or removing machines from the provisioned multi-machine blueprint allows for scaling up and/or down of the systems. When components are added and/or removed, the system configurations are updated. For example, a new web server may be brought online by provisioning the virtual hardware for the web server, configuring the network settings for the new web server, and adding the network information to a load balancer for adding the new web server to a pool of web servers that may be utilized in the application.

FIG. 18 illustrates an example graphical user interface 1800 that may be provided by the cloud manager 138 to configure network information for a multi-machine blueprint. According to the illustrated example, the multi-machine blueprint includes settings for an internal network (Internal Application Network) and a public network (NAT to Shared Network Template). Assigning network information to a multi-machine blueprint facilitates management of the network configuration for the machines provisioned from the multi-machine blueprint without the need to configure each machine individually. Accordingly, when machines are provisioned, the networks are provisioned and the provisioned machines can communicate with the other provisioned machines, load balancers, etc. In addition, load balancer information may be configured with the network information. FIG. 19 illustrates an example graphical user interface 1900 that may be provided by the cloud manager 138 to configure load balancer settings for a particular network configuration (e.g., the NAT to Shared Network Template of FIG. 18). Having a load balancer configured for the network enables changes to provisioned machines (e.g., after provisioning a multi-machine blueprint, after adding components, after removing components, etc.) to be managed by the load balancer. For example, after a new component is added to an application, the new component may be utilized as work is distributed by the load balancer (e.g., web requests may be handled by a newly added web server virtual machine as they are distributed by the load balancer).

Figure 20:
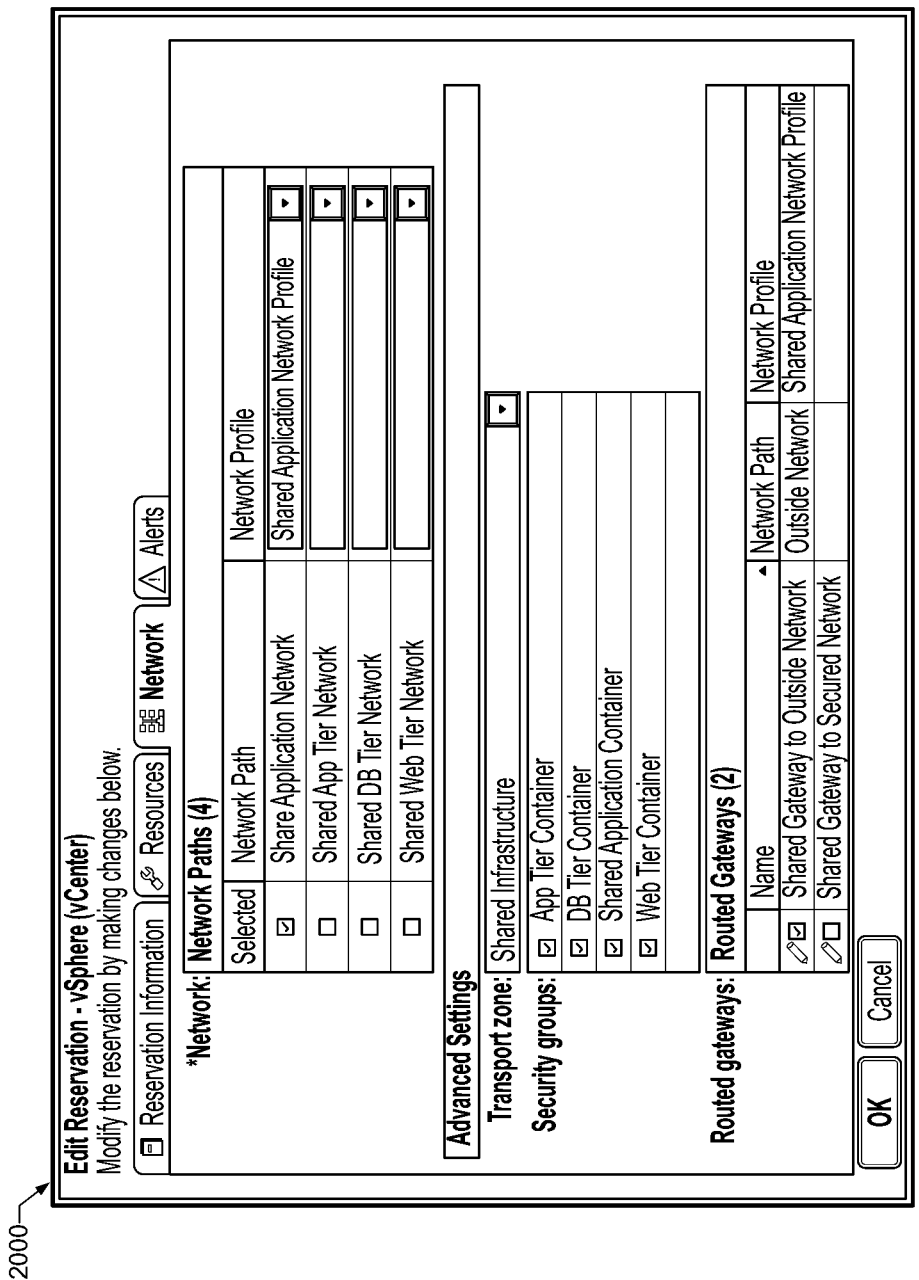

FIG. 20 illustrates an example graphical user interface 2000 that may be provided by the cloud manager 138 to configure network information for reservations for a cloud infrastructure. Reservations provide a means for dividing the resources of the cloud among different groups of users. For example, cloud resources may be divided between a development group, a testing group, and a production group. According to such an example, computing resources (e.g., processor time, memory, storage space, network resources, etc.) could be divided such that the development group is allocated 15% of the resources, the testing group could be allocated 10% of the resources, and the production group could be allocated 75% of the resources. Additionally, multiple network paths may be created and allocated among the groups. For example, a first network path may be shared between the development group and the testing group while a second network path is exclusively used by the production group and not available to the development group or the testing group to ensure the integrity of the production system. Reservations record the allocation of resources as set by an administrator of the infrastructure.

The example user interface 2000 allows a user to input network resources that may be utilized by the group for which the reservation is assigned. For example, if the reservation is for the development group and a member of the development group selects to provision a particular multi-machine blueprint, the machines of the multi-machine blueprint will be allowed to utilize the Share Network Application network and, for example, will not be allowed to utilize the Share App Tier network. The reservations may override a blueprint where the configurations conflict and may supplement the blueprint where a blueprint does not have a configuration value that is included in the reservation. For example, if a multi-machine blueprint requests a particular network that is not allowed by the reservation, the reservation will override and cause the provisioned machines to utilize an allowed network. In such an example, the multi-machine blueprint might specify a network that is not available in the system on which the basic blueprints of the multi-machine blueprint are to be provisioned.

Reservations may override and/or supplement settings other than the network settings. For example, a multi-machine blueprint may be generated with a default set of policies (e.g., a database storage policy that does not include encryption of credit card numbers). The same multi-machine blueprint may be provisioned in multiple localities (e.g., to avoid the need for developing a separate multi-machine blueprint for each locality). Reservations associated with systems at each of the localities may include settings related to governmental policies at the localities (e.g., a policy that requires that credit card information is encrypted before storage in a database). For example, when the multi-machine blueprint having the default policies is provisioned in a locality wherein the reservation specifies a credit card encryption policy, the credit card encryption policy overrides the default policy of the multi-machine blueprint so that systems provisioned from the multi-machine blueprint in the locality will comply with the local laws. Accordingly, a single multi-machine blueprint could be created and deployed to multiple environments that include overriding or supplemental configurations.

Figure 21:
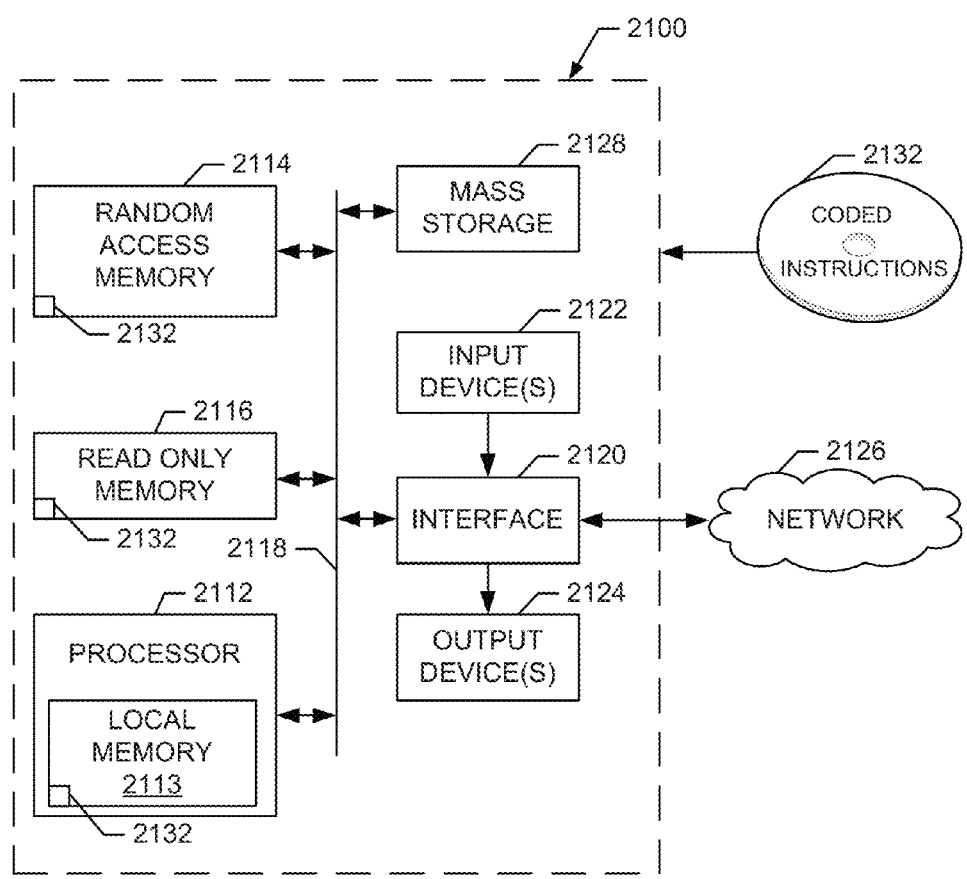
FIG. 21 is a block diagram of an example processing platform capable of executing the example machine readable instructions of FIGS. 5-9 to implement the example cloud manager of FIGS. 1, 2, 3, and/or 4.

FIG. 21 is a block diagram of an example processor platform 2100 capable of executing the instructions of FIGS. 5-9 to implement the cloud manager 138 of FIGS. 1-4. The processor platform 2100 can be, for example, a server or any other type of computing device.

The processor platform 2100 of the illustrated example includes a processor 2112. The processor 2112 of the illustrated example is hardware. For example, the processor 2112 can be implemented by one or more integrated circuits, logic circuits, microprocessors or controllers from any desired family or manufacturer.

The processor 2112 of the illustrated example includes a local memory 2113 (e.g., a cache). The processor 2112 of the illustrated example is in communication with a main memory including a volatile memory 2114 and a non-volatile memory 2116 via a bus 2118. The volatile memory 2114 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 2116 may be implemented by flash memory and/or any other desired type of memory device. Access to the main memory 2114, 2116 is controlled by a memory controller.

The processor platform 2100 of the illustrated example also includes an interface circuit 2120. The interface circuit 2120 may be implemented by any type of interface standard, such as an Ethernet interface, a universal serial bus (USB), and/or a PCI express interface.

In the illustrated example, one or more input devices 2122 are connected to the interface circuit 2120. The input device (s) 2122 permit(s) a user to enter data and commands into the processor 2112. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 2124 are also connected to the interface circuit 2120 of the illustrated example. The output devices 2124 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 2120 of the illustrated example, thus, typically includes a graphics driver card, a graphics driver chip or a graphics driver processor.

The interface circuit 2120 of the illustrated example also includes a communication device such as a transmitter, a receiver, a transceiver, a modem and/or network interface card to facilitate exchange of data with external machines (e.g., computing devices of any kind) via a network 2126 (e.g., an Ethernet connection, a digital subscriber line (DSL), a telephone line, coaxial cable, a cellular telephone system, etc.).

The processor platform 2100 of the illustrated example also includes one or more mass storage devices 2128 for storing software and/or data. Examples of such mass storage devices 2128 include floppy disk drives, hard drive disks, compact disk drives, Blu-ray disk drives, RAID systems, and digital versatile disk (DVD) drives.

The coded instructions 2132 of FIGS. 5-9 may be stored in the mass storage device 2128, in the volatile memory 2114, in the non-volatile memory 2116, and/or on a removable tangible computer readable storage medium such as a CD or DVD.

While several graphical user interfaces are provided as example interfaces for obtaining user input, any other type of user interface and/or control may be provided (e.g., a command line interface, text based interface, slider, text box, etc.). Additionally or alternatively, any of the methods and apparatus described herein may be accessed programmatically (e.g., using an API of the cloud manager 138 (e.g., a vCAC API)) by another program or device.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A method comprising:
   determining, by executing an instruction with a processor, if a characteristic of a virtual machine meets a threshold indicating that the virtual machine is inactive;
   in response to determining that the characteristic meets the threshold:
      transmitting, by executing an instruction with the processor, a notification of inactivity to an administrator of the virtual machine, determining, by executing an instruction with the processor, if a notification period based on the notification has expired, and determining, by executing an instruction with the processor, whether the virtual machine is tagged with an indication that the virtual machine is at least one of a replica of an active virtual machine or a backup of an active virtual machine;

if the notification period has expired and the virtual machine is not tagged with the indication, de-provisioning, by executing an instruction with the processor, the virtual machine to return computing resources assigned to the virtual machine to a computing cloud; and not de-provisioning the virtual machine if the virtual machine is tagged with the indication.

2. A method as defined in claim 1, further including initiating the notification period in response to transmitting the notification.

3. A method as defined in claim 1, wherein the notification period indicates an amount of time to wait before de-provisioning the computing resources after transmitting the notification.

4. A method as defined in claim 1, further including archiving the virtual machine when the virtual machine is de-provisioned.

5. A method as defined in claim 1, wherein the threshold indicates a level of inactivity for the virtual machine.

6. A method as defined in claim 1, wherein the characteristic includes at least one of a last time that the virtual machine was powered on, a last time that the virtual machine was remotely accessed, or an amount of computing resources consumed by the virtual machine.

7. An apparatus comprising:
a notifier to:
transmit a notification of inactivity to an administrator of a virtual machine, and
determine if a notification period based on the notification has expired; and
a resource reclaimer to:
determine if a characteristic of the virtual machine meets a threshold indicating that the virtual machine is inactive,
determine whether the virtual machine is tagged with an indication that the virtual machine is at least one of a replica of an active virtual machine or a backup of an active virtual machine,
in response to determining that the characteristic meets the threshold, the virtual machine is not tagged with the indication, and the notifier determining that the notification period based on the notification has expired, de-provision the virtual machine; and not de-provision the virtual machine if the virtual machine is tagged with the indication, at least one of the notifier or the resource reclaimer implemented by a processor.

8. An apparatus as defined in claim 7, wherein the resource reclaimer is to return computing resources assigned to the de-provisioned virtual machine to a computing cloud.

9. An apparatus as defined in claim 7, further including a user interface to receive an instruction to perform resource reclamation.

10. An apparatus as defined in claim 7, wherein the notifier is to:
determine that the notification of inactivity has not been sent; and in response to determining that the notification has not been sent:
transmit the notification to the administrator of the virtual machine, and
initiate the notification period.

11. An apparatus as defined in claim 7, wherein the notification period indicates an amount of time to wait before de-provisioning the computing resources after transmitting a notification.

12. An apparatus as defined in claim 7, further including an archiver to archive the virtual machine when the virtual machine is de-provisioned.

13. An apparatus as defined in claim 7, wherein the threshold indicates a level of inactivity for the virtual machine.

14. An apparatus as defined in claim 7, wherein the characteristic includes at least one of a last time that the virtual machine was powered on, a last time that the virtual machine was remotely accessed, or an amount of the computing resources consumed by the virtual machine.

15. A tangible computer readable storage medium including instructions that, when executed, cause a processor to at least:
determine if a characteristic of a virtual machine meets a threshold indicating that the virtual machine is inactive;
in response to determining that the characteristic meets the threshold;
transmit a notification of inactivity to an administrator of the virtual machine,
determine if a notification period based on the notification has expired,
determine whether the virtual machine is tagged with an indication that the virtual machine is at least one of a replica of an active virtual machine or a backup of an active virtual machine; and
if the notification period has expired and the virtual machine is not tagged with the indication, de-provision the virtual machine to return computing resources assigned to the virtual machine to a computing cloud; and
not de-provision the virtual machine if the virtual machine is tagged with the indication.

16. A tangible computer readable storage medium as defined in claim 15, wherein the instructions, when executed, cause the processor to initiate the notification period.

17. A tangible computer readable storage medium as defined in claim 15, wherein the notification period indicates an amount of time to wait before de-provisioning the computing resources after transmitting the notification.

18. A tangible computer readable storage medium as defined in claim 15, wherein the instructions, when executed, cause the processor to archive the virtual machine when the virtual machine is de-provisioned.

19. A tangible computer readable storage medium as defined in claim 15, wherein the threshold indicates a level of inactivity for the virtual machine.

20. A tangible computer readable storage medium as defined in claim 15, wherein the characteristic includes at least one of a last time that the virtual machine was powered on, a last time that the virtual machine was remotely accessed, or an amount of the computing resources consumed by the virtual machine.

* * * * *